US012812324B2

(12) United States Patent
Laitinen et al.

(10) Patent No.: US 12,812,324 B2
(45) Date of Patent: Nov. 24, 2026

(54) GENERATING PARAMETRIC SPATIAL AUDIO REPRESENTATIONS

(71) Applicant: Nokia Technologies Oy, Espoo (FI)

(72) Inventors: Mikko-Ville Laitinen, Espoo (FI); Juha Tapio Vilkamo, Helsinki (FI); Jussi Kalevi Virolainen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 164 days.

(21) Appl. No.: 18/490,359

(22) Filed: Oct. 19, 2023

(65) Prior Publication Data

US 2024/0137728 A1 Apr. 25, 2024
US 2024/0236611 A9 Jul. 11, 2024

(30) Foreign Application Priority Data

Oct. 21, 2022 (GB) ...................................... 2215617

(51) Int. Cl.
*H04S 7/00* (2006.01)
*H04R 5/027* (2006.01)
*H04S 1/00* (2006.01)

(52) U.S. Cl.
CPC ............ *H04S 7/306* (2013.01); *H04R 5/027* (2013.01); *H04S 1/007* (2013.01); *H04S 7/304* (2013.01);
(Continued)

(58) Field of Classification Search
CPC .......... H04S 7/306; H04S 1/007; H04S 7/304; H04S 2400/11; H04S 2400/13;
(Continued)

(56) References Cited

U.S. PATENT DOCUMENTS

2012/0057715 A1 3/2012 Johnston et al.
2019/0387350 A1* 12/2019 Audfray ............... G02B 27/017
(Continued)

FOREIGN PATENT DOCUMENTS

CN 114586381 A 6/2022
EP 2544181 A2 1/2013
(Continued)

OTHER PUBLICATIONS

Mikko Ville Laitinen et al, "Parametric time-frequency representation of spatial sound in virtual worlds", ACM Transactions on Applied Percpetion, vol. 9 No. Jun. 2, 2012 (Year: 2012).*
(Continued)

*Primary Examiner* — Vivian C Chin
*Assistant Examiner* — Annabelle Kang
(74) *Attorney, Agent, or Firm* — McCarter & English, LLP.

(57) ABSTRACT

A method for generating a parametric spatial audio stream, the method including: obtaining at least one mono-channel audio signal from at least one close microphone; obtaining at least one of: at least one reverberation parameter; at least one control parameter configured to control spatial features of the parametric spatial audio stream; generating, based on the at least one reverberation parameter, at least one reverberated audio signal from a respective at least one mono-channel audio signal; generating at least one spatial metadata parameter based on at least one of: the at least one mono-channel audio signal; the at least one reverberated audio signal; the at least one control parameter; and the at
(Continued)

least one reverberation parameter; and encoding the at least one reverberated audio signal and the at least one spatial metadata parameter to generate the spatial audio stream.

20 Claims, 11 Drawing Sheets

(52) U.S. Cl.
CPC ....... *H04S 2400/11* (2013.01); *H04S 2400/13* (2013.01); *H04S 2400/15* (2013.01); *H04S 2420/03* (2013.01)

(58) Field of Classification Search
CPC ............. H04S 2400/15; H04S 2420/03; H04S 2420/01; H04R 5/027; H04R 3/00; H04R 2430/03; G10L 19/008
See application file for complete search history.

(56) References Cited

U.S. PATENT DOCUMENTS

| | | | |
|---|---|---|---|
| 2020/0053457 A1 | 2/2020 | Vilkamo | 3/5 |
| 2021/0152969 A1 | 5/2021 | Vilkamo et al. | |

FOREIGN PATENT DOCUMENTS

| | | | |
|---|---|---|---|
| WO | WO 2009/046460 A2 | 4/2009 | |
| WO | WO 2019/197709 A1 | 10/2019 | |
| WO | 2020102156 A1 | 5/2020 | |

OTHER PUBLICATIONS

Laitinen, Mikko-Ville, et al., Parametric Time-Frequency Representation of Spatial Sound in Virtual Worlds, ACM Transactions on Applied Perception, vol. 9, No. 2, Article 8, Jun. 2012, 20 pages.
WO 2009/046460 A2 (Creative Technology LTD) See figure 6C and p. 21 in particular.
EP 2544181 A2 (Dolby Laboratories Licensing Corporation) See whole document. An example of artificially reverberating several sound sources, albeit with no spatial metadata encoded as part of the output.
WO 2019/197709 A1 (Nokia Technologies OY) See figure 3 and paragraphs [0058] and [012] in paticular. An example of the room response having “early” and “late” components, which are simulated separately.

* cited by examiner

GENERATING PARAMETRIC SPATIAL AUDIO REPRESENTATIONS

FIELD

The present application relates to apparatus and methods for generating parametric spatial audio representations, but not exclusively for generating parametric spatial audio representations from a close microphone recording for an audio encoder.

BACKGROUND

There are many ways to capture spatial audio. One option is to capture the spatial audio using a microphone array, e.g., as part of a mobile device. Using the microphone signals, spatial analysis of the sound scene can be performed to determine spatial metadata in frequency bands. Moreover, transport audio signals can be determined using the microphone signals. The spatial metadata and the transport audio signals can be combined to form a spatial audio stream. Another option is to capture audio using a close microphone, a microphone such as a Lavalier microphone located on or very close to a speaker or more generally an audio source. Using the microphone signal, the direction, distance, and the reverberance associated with the microphone signal can be controlled.

Metadata-assisted spatial audio (MASA) is one example of a spatial audio stream. It is one of the input formats the upcoming immersive voice and audio services (IVAS) codec will support. It uses audio signal(s) together with corresponding spatial metadata (containing, e.g., directions and direct-to-total energy ratios in frequency bands) and descriptive metadata (containing additional information relating to, e.g., the original capture and the (transport) audio signal(s)). The MASA stream can, e.g., be obtained by capturing spatial audio with microphones of, e.g., a mobile device, where the set of spatial metadata is estimated based on the microphone signals. The MASA stream can be obtained also from other sources, such as specific spatial audio microphones (such as Ambisonics), studio mixes (e.g., 5.1 mix) or other content by means of a suitable format conversion. It is also possible to use MASA tools inside a codec for the encoding of multichannel channel signals by converting the multichannel signals to a MASA stream and encoding that stream.

SUMMARY

According to a first aspect there is provided a method for generating a parametric spatial audio stream, the method comprising: obtaining at least one mono-channel audio signal from at least one close microphone; obtaining at least one of: at least one reverberation parameter; at least one control parameter configured to control spatial features of the parametric spatial audio stream; generating, based on the at least one reverberation parameter, at least one reverberated audio signal from a respective at least one mono-channel audio signal; generating at least one spatial metadata parameter based on at least one of: the at least one mono-channel audio signal; the at least one reverberated audio signal; the at least one control parameter; and the at least one reverberation parameter; and encoding the at least one reverberated audio signal and the at least one spatial metadata parameter to generate the spatial audio stream.

Generating, based on the at least one reverberation parameter, the least one reverberated audio signal from a respective at least one mono-channel audio signal may comprise: generating, based on the at least one reverberation parameter, at least one reverberant audio signal from a respective at least one mono-channel audio signal; combining, based on the at least one control parameter, the at least one mono-channel audio signal and respective at least one reverberant audio signal to generate the at least one reverberated audio signal.

Combining, based on the at least one control parameter, the at least one mono-channel audio signal and respective at least one reverberant audio signal to generate the at least one reverberated audio signal may comprise: obtaining the at least one control parameter configured to determine a contribution of the at least one mono-channel audio signal and respective at least one reverberant audio signal in the at least one reverberated audio signal; and generating the at least one reverberated audio signal based on the contributions of the at least one mono-channel audio signal and the respective at least one reverberant audio signal defined by the at least one control parameter.

Combining, based on the at least one control parameter, the at least one mono-channel audio signal and respective at least one reverberant audio signal to generate the at least one reverberated audio signal may comprise: obtaining at least one direction and/or position parameter determining at least one direction and/or position of the at least one mono-channel audio signal within an audio scene; generating panning gains based on the at least one direction and/or position parameter; and applying the panning gains to the at least one mono-channel audio signal.

Generating, based on the at least one reverberation parameter, at least one reverberated audio signal from a respective at least one mono-channel audio signal may comprise: generating, based on the at least one reverberation parameter, the at least one reverberated audio signal from a respective at least one mono-channel audio signal.

The at least one reverberated audio signal may comprise a combination of: a reverberant audio signal part from the at least one mono-channel audio signal; and a direct audio signal part based on the respective at least one mono-channel audio signal.

Obtaining at least one mono-channel audio signal from at least one close microphone may comprise at least one of: obtaining the at least one mono-channel audio signal; and beamforming at least two audio signals to generate the at least one mono-channel audio signal.

The at least one reverberation parameter may comprise at least one of: at least one impulse response; a preprocessed at least one impulse response; at least one parameter based on at least one impulse response; at least one desired reverberation time; at least one reverberant-to-direct ratio; at least one room dimension; at least one room material acoustic parameter; at least one decay time; at least one early reflections levels; at least one diffusion parameter; at least one predelay parameter; at least one damping parameter; and at least one acoustics space descriptor.

Obtaining at least one mono-channel audio signal from at least one close microphone may comprise obtaining a first mono-channel audio signal and a second mono-channel audio signal.

The first mono-channel audio signal may be obtained from a first close microphone and the second mono-channel audio signal may be obtained from a second close microphone.

The first close microphone may be a microphone located on or near a first user and the second close microphone may be a microphone located on or near a second user.

Generating, based on the at least one reverberation parameter, at least one reverberated audio signal from a respective at least one mono-channel audio signal may comprise: generating a first reverberant audio signal from the first mono-channel audio signal; and generating a second reverberant audio signal from the second mono-channel audio signal.

Combining, based on the at least one control parameter, the at least one mono-channel audio signal and respective at least one reverberant audio signal to generate the at least one reverberated audio signal may comprise: generating a first audio signal based on a combination of the first mono-channel audio signal and respective first reverberant audio signal; generating a second audio signal based on a combination of the second mono-channel audio signal and respective second reverberant audio signal; combining the first audio signal and the second audio signal to generate the at least one reverberated audio signal.

Generating at least one spatial metadata parameter based on at least one of: the at least one mono-channel audio signal; the at least one reverberated audio signal; the at least one control parameter; and the at least one reverberation parameter may comprise: generating a first at least one spatial metadata parameter associated with the first audio signal; generating a second at least one spatial metadata parameter associated with the second audio signal; determining which of the first mono-channel audio signal or the second mono-channel audio signal is more predominant; and selecting one or other of the first at least one spatial metadata parameter or second at least one spatial metadata parameter based on the determining which of the first mono-channel audio signal or the second mono-channel audio signal is more predominant.

Generating at least one reverberated audio signal from a respective at least one mono-channel audio signal may comprise: generating a first gained audio signal from the first mono-channel audio signal, the first gained audio signal based on a first gain applied to the first audio signal; generating a second gained audio signal from the second mono-channel audio signal, the second gained audio signal based on a second gain applied to the second audio signal; applying a reverberation to a combined first gained audio signal and second gained audio signal to generate the at least one reverberant audio signal; generating a further first gained audio signal from the first mono-channel audio signal, the further first gained audio signal based on a further first gain applied to the first mono-channel audio signal; generating a further second gained audio signal from the second mono-channel audio signal, the further second gained audio signal based on a further second gain applied to the second mono-channel audio signal; and combining the reverberant audio signal, the further first gained audio signal, and the further second gained audio signal to generate the at least one reverberated audio signal.

Generating at least one spatial metadata parameter based on at least one of: the at least one mono-channel audio signal; the at least one reverberated audio signal; the control parameter; and the at least one reverberation parameter may comprise: generating a first at least one spatial metadata parameter associated with the first audio signal; generating a second at least one spatial metadata parameter associated with the second audio signal; determining which of the first mono-channel audio signal or the second mono-channel audio signal is more predominant; and determining the at least one spatial metadata from one or other of the first at least one spatial metadata parameter or second at least one spatial metadata parameter based on the determining which of the first mono-channel audio signal or the second mono-channel audio signal is more predominant.

According to a second aspect there is provided an apparatus for generating a parametric spatial audio stream, the apparatus comprising means configured to: obtain at least one mono-channel audio signal from at least one close microphone; obtain at least one of: at least one reverberation parameter; at least one control parameter configured to control spatial features of the parametric spatial audio stream; generate, based on the at least one reverberation parameter, at least one reverberated audio signal from a respective at least one mono-channel audio signal; generate at least one spatial metadata parameter based on at least one of: the at least one mono-channel audio signal; the at least one reverberated audio signal; the at least one control parameter; and the at least one reverberation parameter; and encode the at least one reverberated audio signal and the at least one spatial metadata parameter to generate the spatial audio stream.

The means configured to generate, based on the at least one reverberation parameter, the least one reverberated audio signal from a respective at least one mono-channel audio signal may be configured to: generate, based on the at least one reverberation parameter, at least one reverberant audio signal from a respective at least one mono-channel audio signal; combining, based on the at least one control parameter, the at least one mono-channel audio signal and respective at least one reverberant audio signal to generate the at least one reverberated audio signal.

The means configured to combine, based on the at least one control parameter, the at least one mono-channel audio signal and respective at least one reverberant audio signal to generate the at least one reverberated audio signal may be configured to: obtain the at least one control parameter configured to determine a contribution of the at least one mono-channel audio signal and respective at least one reverberant audio signal in the at least one reverberated audio signal; and generate the at least one reverberated audio signal based on the contributions of the at least one mono-channel audio signal and the respective at least one reverberant audio signal defined by the at least one control parameter.

The means configured to combine, based on the at least one control parameter, the at least one mono-channel audio signal and respective at least one reverberant audio signal to generate the at least one reverberated audio signal is configured to obtain at least one direction and/or position parameter determining at least one direction and/or position of the at least one mono-channel audio signal within an audio scene; generate panning gains based on the at least one direction and/or position parameter; and apply the panning gains to the at least one mono-channel audio signal.

The means configured to generate, based on the at least one reverberation parameter, at least one reverberated audio signal from a respective at least one mono-channel audio signal may be configured to generate, based on the at least one reverberation parameter, the at least one reverberated audio signal from a respective at least one mono-channel audio signal.

The at least one reverberated audio signal may comprise a combination of: a reverberant audio signal part from the at least one mono-channel audio signal; and a direct audio signal part based on the respective at least one mono-channel audio signal.

The means configured to obtain at least one mono-channel audio signal from at least one close microphone may be configured to perform at least one of: obtain the at least one mono-channel audio signal; and beamform at least two audio signals to generate the at least one mono-channel audio signal.

The at least one reverberation parameter may comprise at least one of: at least one impulse response; a preprocessed at least one impulse response; at least one parameter based on at least one impulse response; at least one desired reverberation time; at least one reverberant-to-direct ratio; at least one room dimension; at least one room material acoustic parameter; at least one decay time; at least one early reflections levels; at least one diffusion parameter; at least one predelay parameter; at least one damping parameter; and at least one acoustics space descriptor.

The means for obtaining at least one mono-channel audio signal from at least one close microphone may comprise obtaining a first mono-channel audio signal and a second mono-channel audio signal.

The first mono-channel audio signal may be obtained from a first close microphone and the second mono-channel audio signal may be obtained from a second close microphone.

The first close microphone may be a microphone located on or near a first user and the second close microphone may be a microphone located on or near a second user.

The means configured to generate, based on the at least one reverberation parameter, at least one reverberated audio signal from a respective at least one mono-channel audio signal may be configured to: generate a first reverberant audio signal from the first mono-channel audio signal; and generate a second reverberant audio signal from the second mono-channel audio signal.

The means configured to combine, based on the at least one control parameter, the at least one mono-channel audio signal and respective at least one reverberant audio signal to generate the at least one reverberated audio signal may be configured to: generate a first audio signal based on a combination of the first mono-channel audio signal and respective first reverberant audio signal; generate a second audio signal based on a combination of the second mono-channel audio signal and respective second reverberant audio signal; combine the first audio signal and the second audio signal to generate the at least one reverberated audio signal.

The means configured to generate at least one spatial metadata parameter based on at least one of: the at least one mono-channel audio signal; the at least one reverberated audio signal; the at least one control parameter; and the at least one reverberation parameter may be configured to: generate a first at least one spatial metadata parameter associated with the first audio signal; generate a second at least one spatial metadata parameter associated with the second audio signal; determine which of the first mono-channel audio signal or the second mono-channel audio signal is more predominant; and select one or other of the first at least one spatial metadata parameter or second at least one spatial metadata parameter based on the determining which of the first mono-channel audio signal or the second mono-channel audio signal is more predominant.

The means configured to generate at least one reverberated audio signal from a respective at least one mono-channel audio signal may be configured to: generate a first gained audio signal from the first mono-channel audio signal, the first gained audio signal based on a first gain applied to the first audio signal; generate a second gained audio signal from the second mono-channel audio signal, the second gained audio signal based on a second gain applied to the second audio signal; apply a reverberation to a combined first gained audio signal and second gained audio signal to generate the at least one reverberant audio signal; generate a further first gained audio signal from the first mono-channel audio signal, the further first gained audio signal based on a further first gain applied to the first mono-channel audio signal; generate a further second gained audio signal from the second mono-channel audio signal, the further second gained audio signal based on a further second gain applied to the second mono-channel audio signal; and combine the reverberant audio signal, the further first gained audio signal, and the further second gained audio signal to generate the at least one reverberated audio signal.

The means configured to generate at least one spatial metadata parameter based on at least one of: the at least one mono-channel audio signal; the at least one reverberated audio signal; the control parameter; and the at least one reverberation parameter may be configured to: generate a first at least one spatial metadata parameter associated with the first audio signal; generate a second at least one spatial metadata parameter associated with the second audio signal; determine which of the first mono-channel audio signal or the second mono-channel audio signal is more predominant; and determine the at least one spatial metadata from one or other of the first at least one spatial metadata parameter or second at least one spatial metadata parameter based on the determining which of the first mono-channel audio signal or the second mono-channel audio signal is more predominant.

According to a third aspect there is provided an apparatus for generating a parametric spatial audio stream, the apparatus comprising at least one processor and at least one memory storing instructions that, when executed by the at least one processor, cause the system at least to perform: obtaining at least one mono-channel audio signal from at least one close microphone; obtaining at least one of: at least one reverberation parameter; at least one control parameter configured to control spatial features of the parametric spatial audio stream; generating, based on the at least one reverberation parameter, at least one reverberated audio signal from a respective at least one mono-channel audio signal; generating at least one spatial metadata parameter based on at least one of: the at least one mono-channel audio signal; the at least one reverberated audio signal; the at least one control parameter; and the at least one reverberation parameter; and encoding the at least one reverberated audio signal and the at least one spatial metadata parameter to generate the spatial audio stream.

The system caused to perform generating, based on the at least one reverberation parameter, the least one reverberated audio signal from a respective at least one mono-channel audio signal may be caused to perform: generating, based on the at least one reverberation parameter, at least one reverberant audio signal from a respective at least one mono-channel audio signal; combining, based on the at least one control parameter, the at least one mono-channel audio signal and respective at least one reverberant audio signal to generate the at least one reverberated audio signal.

The system caused to perform combining, based on the at least one control parameter, the at least one mono-channel audio signal and respective at least one reverberant audio signal to generate the at least one reverberated audio signal may be caused to perform: obtaining the at least one control parameter configured to determine a contribution of the at least one mono-channel audio signal and respective at least one reverberant audio signal in the at least one reverberated audio signal; and generating the at least one reverberated audio signal based on the contributions of the at least one mono-channel audio signal and the respective at least one reverberant audio signal defined by the at least one control parameter.

The system caused to perform combining, based on the at least one control parameter, the at least one mono-channel audio signal and respective at least one reverberant audio signal to generate the at least one reverberated audio signal may be caused to perform: obtaining at least one direction and/or position parameter determining at least one direction and/or position of the at least one mono-channel audio signal within an audio scene; generating panning gains based on the at least one direction and/or position parameter; and applying the panning gains to the at least one mono-channel audio signal.

The system caused to perform generating, based on the at least one reverberation parameter, at least one reverberated audio signal from a respective at least one mono-channel audio signal may be caused to perform: generating, based on the at least one reverberation parameter, the at least one reverberated audio signal from a respective at least one mono-channel audio signal.

The at least one reverberated audio signal may comprise a combination of: a reverberant audio signal part from the at least one mono-channel audio signal; and a direct audio signal part based on the respective at least one mono-channel audio signal.

The system caused to perform obtaining at least one mono-channel audio signal from at least one close microphone may be caused to perform at least one of: obtaining the at least one mono-channel audio signal; and beamforming at least two audio signals to generate the at least one mono-channel audio signal.

The at least one reverberation parameter may comprise at least one of: at least one impulse response; a preprocessed at least one impulse response; at least one parameter based on at least one impulse response; at least one desired reverberation time; at least one reverberant-to-direct ratio; at least one room dimension; at least one room material acoustic parameter; at least one decay time; at least one early reflections levels; at least one diffusion parameter; at least one predelay parameter; at least one damping parameter; and at least one acoustics space descriptor.

The system caused to perform obtaining at least one mono-channel audio signal from at least one close microphone may be caused to perform obtaining a first mono-channel audio signal and a second mono-channel audio signal.

The first mono-channel audio signal may be obtained from a first close microphone and the second mono-channel audio signal may be obtained from a second close microphone.

The first close microphone may be a microphone located on or near a first user and the second close microphone may be a microphone located on or near a second user.

The system caused to perform generating, based on the at least one reverberation parameter, at least one reverberated audio signal from a respective at least one mono-channel audio signal may be caused to perform: generating a first reverberant audio signal from the first mono-channel audio signal; and generating a second reverberant audio signal from the second mono-channel audio signal.

The system caused to perform combining, based on the at least one control parameter, the at least one mono-channel audio signal and respective at least one reverberant audio signal to generate the at least one reverberated audio signal may be caused to perform: generating a first audio signal based on a combination of the first mono-channel audio signal and respective first reverberant audio signal; generating a second audio signal based on a combination of the second mono-channel audio signal and respective second reverberant audio signal; combining the first audio signal and the second audio signal to generate the at least one reverberated audio signal.

The system caused to perform generating at least one spatial metadata parameter based on at least one of: the at least one mono-channel audio signal; the at least one reverberated audio signal; the at least one control parameter; and the at least one reverberation parameter may be caused to perform: generating a first at least one spatial metadata parameter associated with the first audio signal; generating a second at least one spatial metadata parameter associated with the second audio signal; determining which of the first mono-channel audio signal or the second mono-channel audio signal is more predominant; and selecting one or other of the first at least one spatial metadata parameter or second at least one spatial metadata parameter based on the determining which of the first mono-channel audio signal or the second mono-channel audio signal is more predominant.

The system caused to perform generating at least one reverberated audio signal from a respective at least one mono-channel audio signal may be caused to perform: generating a first gained audio signal from the first mono-channel audio signal, the first gained audio signal based on a first gain applied to the first audio signal; generating a second gained audio signal from the second mono-channel audio signal, the second gained audio signal based on a second gain applied to the second audio signal; applying a reverberation to a combined first gained audio signal and second gained audio signal to generate the at least one reverberant audio signal; generating a further first gained audio signal from the first mono-channel audio signal, the further first gained audio signal based on a further first gain applied to the first mono-channel audio signal; generating a further second gained audio signal from the second mono-channel audio signal, the further second gained audio signal based on a further second gain applied to the second mono-channel audio signal; and combining the reverberant audio signal, the further first gained audio signal, and the further second gained audio signal to generate the at least one reverberated audio signal.

The system caused to perform generating at least one spatial metadata parameter based on at least one of: the at least one mono-channel audio signal; the at least one reverberated audio signal; the control parameter; and the at least one reverberation parameter may be caused to perform: generating a first at least one spatial metadata parameter associated with the first audio signal; generating a second at least one spatial metadata parameter associated with the second audio signal; determining which of the first mono-channel audio signal or the second mono-channel audio signal is more predominant; and determining the at least one spatial metadata from one or other of the first at least one spatial metadata parameter or second at least one spatial metadata parameter based on the determining which of the first mono-channel audio signal or the second mono-channel audio signal is more predominant.

According to a fourth aspect there is provided an apparatus for generating a parametric spatial audio stream, the apparatus comprising: obtaining circuitry configured to obtain at least one mono-channel audio signal from at least one close microphone; obtaining circuitry configured to obtain at least one of: at least one reverberation parameter; at least one control parameter configured to control spatial features of the parametric spatial audio stream; generating circuitry configured to generate, based on the at least one reverberation parameter, at least one reverberated audio signal from a respective at least one mono-channel audio signal; generating circuitry configured to generate at least one spatial metadata parameter based on at least one of: the at least one mono-channel audio signal; the at least one reverberated audio signal; the at least one control parameter; and the at least one reverberation parameter; and encoding circuitry configured to encode the at least one reverberated audio signal and the at least one spatial metadata parameter to generate the spatial audio stream.

According to a fifth aspect there is provided a computer program comprising instructions [or a computer readable medium comprising instructions] for causing an apparatus for generating a parametric spatial audio stream, the apparatus caused to perform at least the following: obtaining at least one mono-channel audio signal from at least one close microphone; obtaining at least one of: at least one reverberation parameter; at least one control parameter configured to control spatial features of the parametric spatial audio stream; generating, based on the at least one reverberation parameter, at least one reverberated audio signal from a respective at least one mono-channel audio signal; generating at least one spatial metadata parameter based on at least one of: the at least one mono-channel audio signal; the at least one reverberated audio signal; the at least one control parameter; and the at least one reverberation parameter; and encoding the at least one reverberated audio signal and the at least one spatial metadata parameter to generate the spatial audio stream.

According to a sixth aspect there is provided a non-transitory computer readable medium comprising program instructions for causing an apparatus, for generating a parametric spatial audio stream, to perform at least the following: obtaining at least one mono-channel audio signal from at least one close microphone; obtaining at least one of: at least one reverberation parameter; at least one control parameter configured to control spatial features of the parametric spatial audio stream; generating, based on the at least one reverberation parameter, at least one reverberated audio signal from a respective at least one mono-channel audio signal; generating at least one spatial metadata parameter based on at least one of: the at least one mono-channel audio signal; the at least one reverberated audio signal; the at least one control parameter; and the at least one reverberation parameter; and encoding the at least one reverberated audio signal and the at least one spatial metadata parameter to generate the spatial audio stream.

According to a seventh aspect there is provided an apparatus for generating a parametric spatial audio stream, the apparatus comprising: means for obtaining at least one mono-channel audio signal from at least one close microphone; means for obtaining at least one of: at least one reverberation parameter; at least one control parameter configured to control spatial features of the parametric spatial audio stream; generating, based on the at least one reverberation parameter, at least one reverberated audio signal from a respective at least one mono-channel audio signal; means for generating at least one spatial metadata parameter based on at least one of: the at least one mono-channel audio signal; the at least one reverberated audio signal; the at least one control parameter; and the at least one reverberation parameter; and means for encoding the at least one reverberated audio signal and the at least one spatial metadata parameter to generate the spatial audio stream.

An apparatus comprising means for performing the actions of the method as described above.

An apparatus configured to perform the actions of the method as described above.

A computer program comprising program instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

Figure 1:
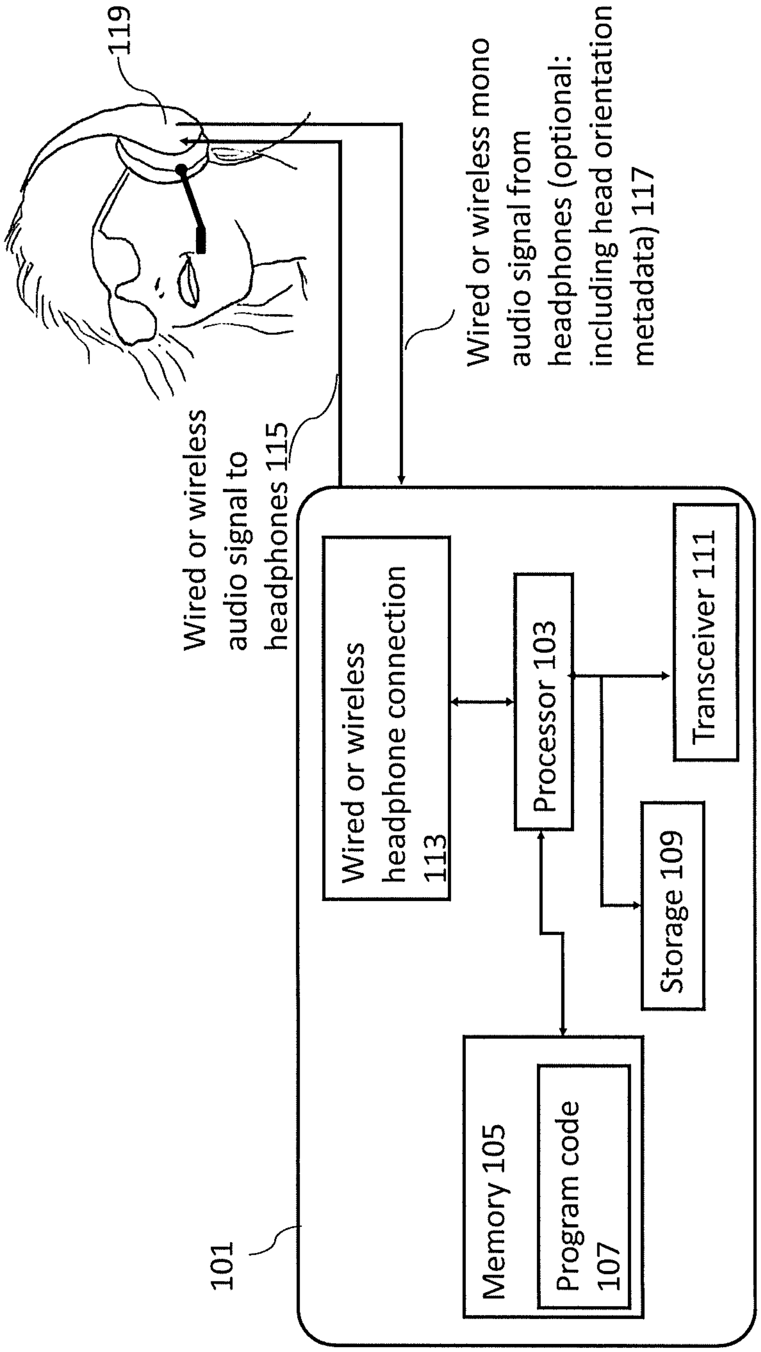
FIG. 1 shows schematically an example system of apparatus suitable for implementing some embodiments.

The following describes in further detail suitable apparatus and possible mechanisms for the generation of audio streams from captured or otherwise obtained close microphone audio signals.

As discussed above Metadata-Assisted Spatial Audio (MASA) is an example of a parametric spatial audio format and representation suitable as an input format for IVAS.

It can be considered an audio representation consisting of 'N channels+spatial metadata'. It is a scene-based audio format particularly suited for spatial audio capture on practical devices, such as smartphones. The idea is to describe the sound scene in terms of time- and frequency-varying sound directions and, e.g., energy ratios. Sound energy that is not defined (described) by the directions, is described as diffuse (coming from all directions).

As discussed above spatial metadata associated with the audio signals may comprise multiple parameters (such as multiple directions and associated with each direction (or directional value) a direct-to-total ratio, spread coherence, distance, etc.) per time-frequency tile. The spatial metadata may also comprise other parameters or may be associated with other parameters which are considered to be non-directional (such as surround coherence, diffuse-to-total energy ratio, remainder-to-total energy ratio) but when combined with the directional parameters are able to be used to define the characteristics of the audio scene. For example a reasonable design choice which is able to produce a good quality output is one where the spatial metadata comprises one or more directions for each time-frequency portion (and associated with each direction direct-to-total ratios, spread coherence, distance values etc) are determined.

As described above, parametric spatial metadata representation can use multiple concurrent spatial directions. With MASA, the proposed maximum number of concurrent directions is two. For each concurrent direction, there may be associated parameters such as: Direction index; Direct-to-total ratio; Spread coherence; and Distance. In some embodiments other parameters such as Diffuse-to-total energy ratio; Surround coherence; and Remainder-to-total energy ratio are defined.

The parametric spatial metadata values are available for each time-frequency tile (the MASA format defines that there are 24 frequency bands and 4 temporal sub-frames in each frame). The frame size in IVAS is 20 ms. Furthermore currently MASA supports 1 or 2 directions for each time-frequency tile.

Example metadata parameters can be:

- Format descriptor which defines the MASA format for IVAS;
- Channel audio format which defines a combined following fields stored in two bytes;
- Number of directions which defines a number of directions described by the spatial metadata (Each direction is associated with a set of direction dependent spatial metadata as described afterwards);
- Number of channels which defines a number of transport channels in the format;
- Source format which describes the original format from which MASA was created.

Examples of the MASA format spatial metadata parameters which are dependent of number of directions can be:

- Direction index which defines a direction of arrival of the sound at a time-frequency parameter interval. (typically this is a spherical representation at about 1-degree accuracy);
- Direct-to-total energy ratio which defines an energy ratio for the direction index (i.e., time-frequency subframe); and
- Spread coherence which defines a spread of energy for the direction index (i.e., time-frequency subframe).

Examples of MASA format spatial metadata parameters which are independent of number of directions can be:

- Diffuse-to-total energy ratio which defines an energy ratio of non-directional sound over surrounding directions;
- Surround coherence which defines a coherence of the non-directional sound over the surrounding directions;
- Remainder-to-total energy ratio which defines an energy ratio of the remainder (such as microphone noise) sound energy to fulfil requirement that sum of energy ratios is 1.

Furthermore example spatial metadata frequency bands can be

| Band | LF (Hz) | HF (Hz) | BW (Hz) |
|---|---|---|---|
| 1 | 0 | 400 | 400 |
| 2 | 400 | 800 | 400 |
| 3 | 800 | 1200 | 400 |
| 4 | 1200 | 1600 | 400 |
| 5 | 1600 | 2000 | 400 |
| 6 | 2000 | 2400 | 400 |
| 7 | 2400 | 2800 | 400 |
| 8 | 2800 | 3200 | 400 |
| 9 | 3200 | 3600 | 400 |
| 10 | 3600 | 4000 | 400 |
| 11 | 4000 | 4400 | 400 |
| 12 | 4400 | 4800 | 400 |
| 13 | 4800 | 5200 | 400 |
| 14 | 5200 | 5600 | 400 |
| 15 | 5600 | 6000 | 400 |
| 16 | 6000 | 6400 | 400 |
| 17 | 6400 | 6800 | 400 |
| 18 | 6800 | 7200 | 400 |
| 19 | 7200 | 7600 | 400 |
| 20 | 7600 | 8000 | 400 |
| 21 | 8000 | 10000 | 2000 |
| 22 | 10000 | 12000 | 2000 |
| 23 | 12000 | 16000 | 4000 |
| 24 | 16000 | 24000 | 8000 |

The MASA stream can be rendered to various outputs, such as multichannel loudspeaker signals (e.g., 5.1) or binaural signals.

Monaural audio signal capture (for example with a close microphone) may be sufficient in simple communication scenarios (for example where a user is normally talking with a single person). However simple communication scenarios typically do not have spatial aspects available. This may be a problem especially when there are multiple participants present as in multiparty voice conferencing. Human hearing is capable of understanding multiple talkers better when they are positioned to different directions. This is known as the cocktail party effect in the scientific literature.

A simple way to achieve this is to binauralize the talker to a certain direction using head-related transfer functions (HRTF). This way different talkers in a teleconference can be positioned to different directions to improve the speech intelligibility. Moreover, reverberation may be added in a moderate level to increase the naturalness of the rendering, and to achieve a better externalization for the binauralization. The reverberation may also be used to achieve different rendered distances for the different talkers.

This binauralization (including the reverberation) can be implemented, in some circumstances in the device of the user. However, the user would need to receive an individual audio stream from each participant in the teleconference (decentralized architecture). This would therefore require significant bandwidth in the transmission, which may not always be available. Moreover, this approach may be computationally demanding, as decoding and rendering of each participant audio signal has to be performed in the device of the user. As such not only would it produce a poor quality output where the processor is unable to handle the computational demands of such a process but a mobile device powered by battery may suffer from short battery life due to the processing requirements.

As another option, the binauralization (including the reverberation) can be implemented in a conference server (centralized architecture). In this case, the binauralization would be applied to each participant in the server, and the resulting binaural signals would be mixed together to form a single pair of binaural signals, which would be transmitted to the user. This would lead to lower bandwidth required for the transmission, and lower computational complexity required in the device of the user. However, the problem with this approach is that as the binauralization would be applied already in the server, the rendering at the receiving device can not be performed based on the orientation of the head of the user (i.e., head-tracked binauralization could not be performed). This would produce lower immersion and naturalness, as the sound sources would move with the movement of the user's head rather than remaining in their defined positions.

Moreover, in some situations some participants could be captured in a parametric form, such as the aforementioned MASA, the close microphone signals would have to be handled and processed separately, leading to more transmitted audio signals (and thus requiring a higher bandwidth and higher computational complexity), or, alternatively, the loss of the head-tracked binauralization for all sources if the binauralization would be performed for all sources already in the server.

As such obtaining spatial features for head-tracked binauralization of close microphone captured audio leads to requiring a high bitrate in transmission and high computational complexity in rendering. As a result, a head-tracked binauralization would not be used in many cases because of situations where there is not having enough bandwidth in the communications channels and/or too not sufficient computational resources or battery resources.

The concept as discussed in the embodiments in further detail herein is for generating a parametric spatial audio stream (transport audio signal(s) and spatial metadata) from audio captured using a close (mono) microphone. In some embodiments this can be implemented based on a reverberator that can generate reverberation according to desired reverberation characteristics to achieve generation of a parametric spatial audio stream (which can be efficiently coded and rendered to various outputs including head-tracked binaural audio) where the speech of the user can be positioned to a controllable direction and distance and the generated reverberation can be added in a controllable manner to enable, e.g., spatial teleconferencing using headphones and a close microphone. It can be configured to generate a reverberated (stereo) signal using the captured mono signal, determine parametric spatial metadata using the captured audio signal, the generated reverberated audio signal and at least one control (e.g., the desired direction), and mix the audio signals to produce transport audio signals.

In the description herein the term "audio signal" may refer to an audio signal having one channel or an audio signal with multiple channels. When it is relevant to specify that a signal has one or more channels, it is stated explicitly. Furthermore, the term "audio signal" can mean that the signal is in any form, such as an encoded or non-encoded form, e.g., a sequence of values defining a signal waveform or spectral values.

With respect to FIG. 1 is shown an example apparatus for implementing some embodiments. In the example shown in FIG. 1, there is shown a mobile phone 101 coupled via a wired or wireless connection 113 with headphones 119 worn by the user of the mobile phone 101. In the following the example device or apparatus is a mobile phone as shown in FIG. 1. However the example apparatus or device could also be any other suitable device, such as a tablet, a laptop, computer, or any teleconference device. The apparatus or device could furthermore be the headphones itself so that the operations of the exemplified mobile phone 101 are performed by the headphones.

In this example the mobile phone 101 comprises a processor 103. The processor 103 can be configured to execute various program codes such as the methods such as described herein. The processor 103 is configured to communicate with the headphones 119 using a wired or wireless headphone connection 113. In some embodiments the wired or wireless headphone connection 113 is a Bluetooth 5.3 or Bluetooth LE Audio connection. The connection 113 provides from a processor 103 a two-channel audio signal 115 to be reproduced to the user with the headphones. The connection 113 also provides from the headphones 119 a mono-channel audio signal 117 to the processor 103, where the mono audio signal originates from a microphone mounted on a boom connected to the headphones.

In other examples there is no boom or extended close microphone as shown in FIG. 1, but the headphones are equipped with one or more microphones configured to provide a single channel audio signal capturing the user's voice, for example, using beamform techniques. Regardless of the microphone(s) type, it is referred to as "close microphone" as the sound is captured close to the user.

The headphones 119 could be over-ear headphones as shown in FIG. 1, or any other suitable type such as in-ear, or bone-conducting headphones, or any other type of headphones. In some embodiments, the headphones 119 have a head orientation sensor providing head orientation information to the processor 103. In some embodiments, a head-orientation sensor is separate from the headphones 119 and the data is provided to the processor 103 separately. In further embodiments, the head orientation is tracked by other means, such as using the device 101 camera and a machine-learning based face orientation analysis. In some embodiments, the head orientation is not tracked.

In some embodiments the processor 103 is coupled with a memory 105 having program code 107 providing processing instructions according to the following embodiments. The program code 107 has instructions to process the mono-channel audio signal 117 captured by one or more of the microphones at the headphones 119 to a processed form suitable for effective encoding and immersive decoding at a remote apparatus. These processed audio signals are provided from the processor 103 to a transceiver 111 to the remote decoding apparatus, and/or in some cases, stored to the storage 109 for later use.

The transceiver can communicate with further apparatus by any suitable known communications protocol. For example in some embodiments the transceiver can use a suitable radio access architecture based on long term evolution advanced (LTE Advanced, LTE-A) or new radio (NR) (or can be referred to as 5G), universal mobile telecommunications system (UMTS) radio access network (UTRAN or E-UTRAN), long term evolution (LTE, the same as E-UTRA), 2G networks (legacy network technology), wireless local area network (WLAN or Wi-Fi), worldwide interoperability for microwave access (WiMAX), Bluetooth®, personal communications services (PCS), Zig Bee®, wideband code division multiple access (WCDMA), systems using ultra-wideband (UWB) technology, sensor networks, mobile ad-hoc networks (MANETs), cellular internet of things (IoT) RAN and Internet Protocol multimedia subsystems (IMS), any other suitable option and/or any combination thereof.

The remote receiver (or playback device) of the processed audio bit stream may be a system similar to or exactly like the apparatus and headphones system shown in FIG. 1. In the playback device, the encoded audio signal from a transceiver is provided to a processor to be decoded and rendered to binaural spatial sound to be forwarded (with the wired or wireless headphone connection) to headphones to be reproduced to the listener (user).

Additionally with respect to the playback device there may be head tracking involved. In this case, the playback device processor receives the head orientation information from the listener (user), and the processing is altered based on the head orientation information, as is exemplified in the following embodiments.

In some embodiments the device comprises a user interface (not shown) which can be coupled in some embodiments to the processor. In some embodiments the processor can control the operation of the user interface and receive inputs from the user interface. In some embodiments the user interface can enable a user to input commands to the device, for example via a keypad. In some embodiments the user interface can enable the user to obtain information from the device. For example the user interface may comprise a display configured to display information from the device to the user. The user interface can in some embodiments comprise a touch screen or touch interface capable of both enabling information to be entered to the device and further displaying information to the user of the device. In some embodiments the user interface may be the user interface for communicating.

Figure 2:
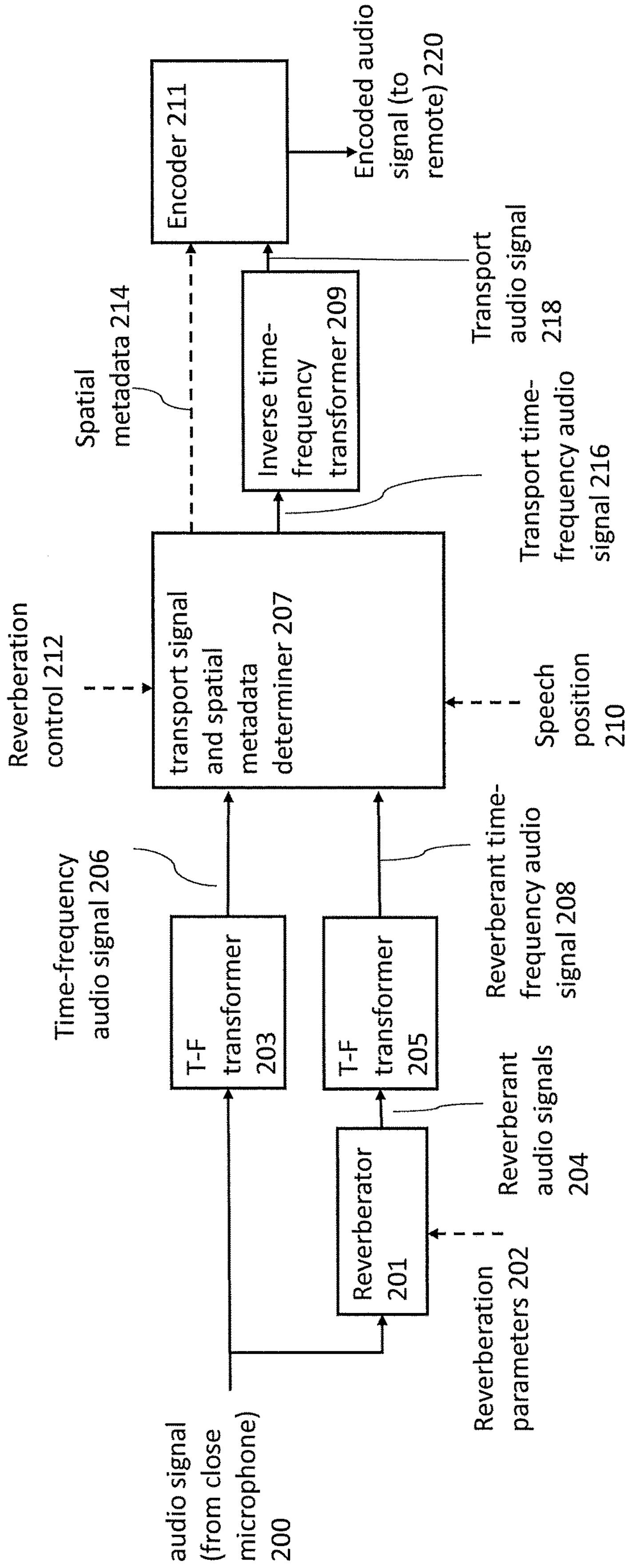
FIG. 2 shows schematically an example capture apparatus suitable for implementing some embodiments.
Figure 4:
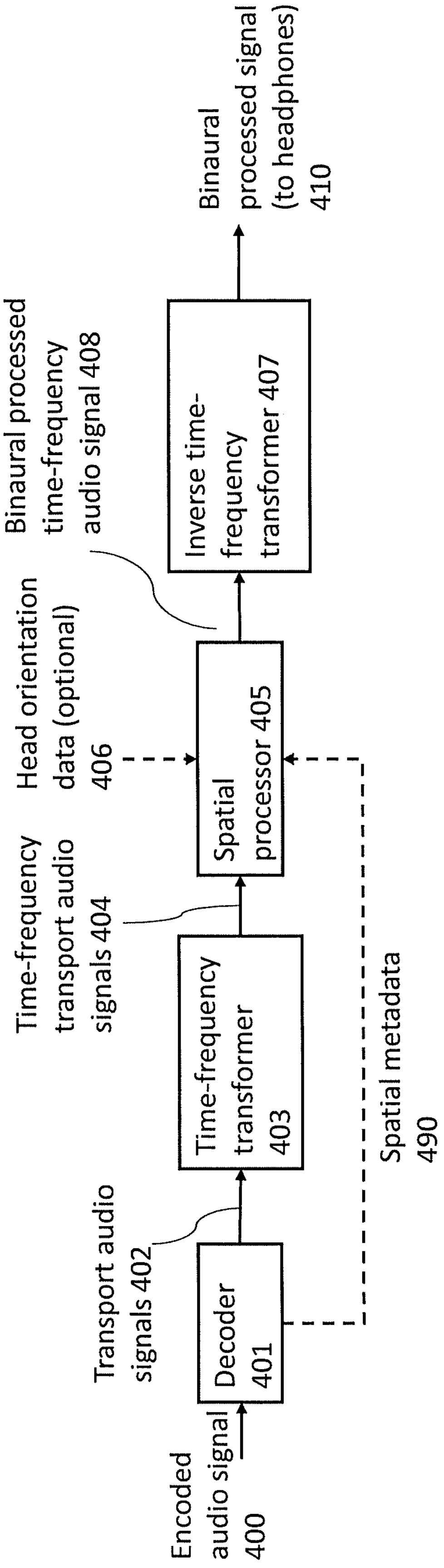
FIG. 4 shows schematically an example playback apparatus suitable for implementing some embodiments.

With respect to FIG. 2 is shown a schematic view of the processor 103 with respect to a capture aspect, where an encoded bit stream is generated based on the captured mono-channel audio signal from the headphones 119. FIG. 4 furthermore shows a schematic view of the processor with respect to a corresponding remote decoder/playback apparatus. It is understood that in some embodiments a single apparatus can perform processing according to FIG. 2, as well as FIG. 4, when receiving another encoded spatial audio stream back from a remote device.

In some embodiments as shown in FIG. 2, the processor is configured to receive as an input the audio signal 200 s(t), obtained from the close microphone at the headphones 119 as shown in FIG. 1.

The processor 103 furthermore in some embodiments comprises a reverberator 201. The reverberator 201 is configured to receive the audio signal 200 and the reverberation parameters 202 and generate a reverberant audio signal 204 $s_{rev}(t, i)$ (where t is time and i is channel index).

The reverberator 201 can be implemented using any suitable reverberator, such as the Feedback-Delay-Network (FDN) reverberator (such as described in Rocchesso: Maximally Diffusive Yet Efficient Feedback Delay Networks for Artificial Reverberation, IEEE Signal Processing Letters, Vol. 4. No. 9, September 1997). A feedback delay network is composed of delay lines with different lengths and feedback matrices that feed the outputs of the delay lines back to the delay lines, thus achieving the infinite reverberation response, where the decay of the response is achieved with attenuation filters. In other embodiments any other reverberator type can be employed, such as using convolution with predetermined reverberation responses. The convolution can be implemented efficiently and without latency using hybrid convolution means that process part of the response with direct convolution, and other parts using FFT convolution such as shown in Gardner, W. G. (1994, November). Efficient convolution without input/output delay. In Audio Engineering Society Convention 97. Audio Engineering Society.

In some embodiments the reverberation parameters 202 comprise parameters that control the generation of the reverberation (examples of parameters can be desired reverberation times RT60(k), reverberant-to-direct ratios RDR (k), and/or dimensions and/or one or more materials of a virtual environment). Reverberation parameters may also be presented in a way they are commonly used in digital studio reverbs and reverb plugins such as decay time, early reflections level, diffusion, predelay, damping, room size etc. A simplified way to define reverberation parameters is to use predefined presets of different kinds of acoustics spaces that can be described by descriptive name (e.g., small room, hall, bathroom, anechoic), each of which produce unique set of reverberation characteristics. Reverberation parameters may also comprise impulse responses, either as is, or in a pre-processed form using any suitable means such as using a time-frequency transform and/or any suitable parameterization.

In some embodiments, the reverberation parameters 202 can be obtained from the capture device or the user to mimic the space where the user is. One example of these embodiments is mixed reality audio with a hear-through binaural headset. This kind of headset contains binaural microphones to capture sound from the encircling environment and to allow the user to hear these sounds through the headphones. User may control the level feed from to binaural microphones to the loudspeakers to define how much of the environmental sounds can be heard. Additional virtual sound sources (e.g., voices of conference participants) may be mixed with these environmental sounds. In order to create natural immersion and illusion that virtual sound sources emanate from the real acoustic environment, the reverberation properties of the virtual sound sources should be aligned with the reverberation properties of the real acoustic environment (where the user is). In this case, reverberation parameters can be estimated from the captured audio signals and used to control the reverberation applied on the virtual sounds.

In some embodiments, reverberation parameters may not be obtained and default values used by the reverberator 201. In some embodiments the reverberated audio signals comprises a combination of the input audio signal and the reverberated audio signals. In some embodiments the reverberated audio signals are generated and combined with the input audio signal based on a suitable mixing or control parameter. However, in some embodiments the reverberated audio part is not separate from the input audio signal part. In other words, a control parameter is provided to a system (which would include reverberator) that reverberates the audio signal and produces a combined audio signal according to the control parameter, but so that the only-reverberation signal is never available as a separate audio signal. This for example can be implemented in some embodiments to reduce the complexity of the generation of the transport audio signals as described hereafter to simply passing the 'combined audio signal' of input and reverberated audio signal parts as the transport audio signal.

Additionally in some embodiments the processor 103 comprises time-frequency transformers 203, 205. In this example there is shown a time-frequency transformer 203 configured to receive the audio signal (from the close microphone) 200 and generate time-frequency audio signal 206 and a further time-frequency transformer 205 configured to receive the reverberant audio signal 204 and generate a reverberant time-frequency audio signal 208. In some embodiments the time-frequency transformers are implemented by a short-time Fourier transform (STFT) configured to take a frame of 960 samples of the microphone audio signal(s), concatenating this frame with the previous 960 samples, applying a square-root of the 2*960 length Hann window to the concatenated frames, and applying a fast Fourier transform (FFT) to the result. In other embodiments other time-frequency transforms (such as complex-modulated quadrature mirror filter bank) or a low-delay variant thereof can be employed.

The time-frequency mono audio signal 206 can be denoted S(b,n) where b is a frequency bin index and n is the time index.

The reverberant time-frequency audio signals $S_{rev}(b,n,i)$ where i is the channel index can also be denoted in a column vector form $$s_{rev}(b,n) = \begin{bmatrix} S_{rev}(b,n,1) \\ S_{rev}(b,n,2) \end{bmatrix}$$

The time-frequency audio signal 206 S(b,n) and the reverberant time-frequency audio signals 208 $s_{rev}(b,n)$ are forwarded to the transport signal and spatial metadata determiner 207.

In some embodiments the processor comprises a transport signal and spatial metadata determiner 207 configured to receive the time-frequency audio signal 206 S(b,n) and the reverberant time-frequency audio signals 208 $s_{rev}(b,n)$ and also a speech position 210 and reverberation control 212 input.

The speech position 210 input, in some embodiments comprises a desired direction-of-arrival for the speech DOA (n). The reverberation control 212 input in some embodiments comprises information for controlling the levels of the direct sound and the reverberation parts, e.g., the gains $g_s$ and $g_r$.

The speech position 210 and the reverberation control 212 information may be obtained from the user, or they may be obtained, for example, automatically from the capture device. In other embodiments, default values stored in the transport signal and spatial metadata determiner 207 may be used.

In some embodiments the transport signal and spatial metadata determiner is configured to apply gains to control the levels of the direct sound and reverberation signals by $$S'(b,n)=g_s S(b,n)$$

$$s'_{rev}(b,n)=g_r s_{rev}(b,n)$$

where the gains may be set for example in terms of how far the sound is to be rendered. For example, when the distance is increased, $g_s$ may be a smaller value. In some configurations, the level of the reverberation may have smaller values with respect to the direct sound to maximize clarity.

In some embodiments the transport signal and spatial metadata determiner is configured to determine transport time-frequency audio signals 216. These can be, for example generated by $$s_{transport}(b,n)=p(\mathrm{DOA}(n))S'(b,n)+s'_{rev}(b,n)$$

where p(DOA(n)) is a column vector having panning gains according to DOA(n). For example, the panning function could be $$p(DOA(n)) = \begin{bmatrix} \sin(0.5*\arcsin(DOA_y(n))+0.25\pi) \\ \cos(0.5*\arcsin(DOA_y(n))+0.25\pi) \end{bmatrix}$$

where $\mathrm{DOA}_y(n)$ is the y-axis component of a unit vector pointing towards DOA(n). The transport time-frequency audio signals 216 can then be provided to an inverse time-frequency transformer 209.

The transport signal and spatial metadata determiner 207 can furthermore be configured to determine spatial metadata 214. The spatial metadata 214 can in some embodiments be in a MASA spatial metadata format, so that the direction values of all frequency bands k are set to DOA(n), i.e., $$\mathrm{DOA}(k,n)=\mathrm{DOA}(n).$$

Furthermore, the direct-to-total energy ratios can be determined by $$\mathrm{ratio}(k,n) = \frac{\sum_{b=b_{low}(k)}^{b_{high}(k)} |S'(b,n)|^2}{\sum_{b=b_{low}(k)}^{b_{high}(k)} s^H_{transport}(b,n) s_{transport}(b,n)}$$

where $b_{low}(k)$ and $b_{hig}$ (k) are the bottom and top frequency bins of frequency band k. The ratio value may be upper limited to 1, as it is possible in above formulas that the ratio slightly exceeds 1 depending on the signal phase relations.

In some embodiments other parameters (of the MASA metadata) may be set to zero (e.g., the coherences), or to any suitable values (e.g., the diffuseness may be determined as 1−ratio(k,n)).

The spatial metadata 214 in some embodiments is then provided to the encoder 211.

In some embodiments the processor further comprises an inverse time-frequency transformer 209 configured to receive the transport time-frequency audio signal 216 and applies an inverse time-frequency transform corresponding to the forward transform applied at the time-frequency transformers 203, 205. For example the inverse time-frequency transformer 209 can comprise an inverse STFT operation if a STFT was applied by the time-frequency transformer. The inverse time-frequency transformer is configured to generate transport audio signal 218, which are provided to the encoder 211.

In some embodiments the transport audio signals are generated in the time domain instead of frequency domain to provide a lower latency. In that case, the audio signal 200 and the reverberant audio signals 204 are also provided to the transport signal and spatial metadata determiner 207. The transport audio signals may then be generated by $$s_{transport}(t,i)=p(\mathrm{DOA}(s(t)+s_{rev}(t,i)$$

and the $s_{transport}(t, i)$ is then the transport audio signal 208 provided directly from the transport signal and spatial metadata determiner 207 to the encoder 211. In this scenario, the inverse time-frequency transformer 209 is not needed and the spatial metadata may be determined as described in the foregoing.

The processor, in some embodiments, comprises an encoder configured to receive the transport audio signal 218 and the spatial metadata 214 and applies suitable encoding to them. For example when the transport audio signal 218 and the spatial metadata 214 are in the form of a MASA stream, an IVAS encoder may be used to encode them.

The output of the encoder, the encoded audio signal or stream 220, can be provided to a remote decoder via the transceiver.

Figure 3:
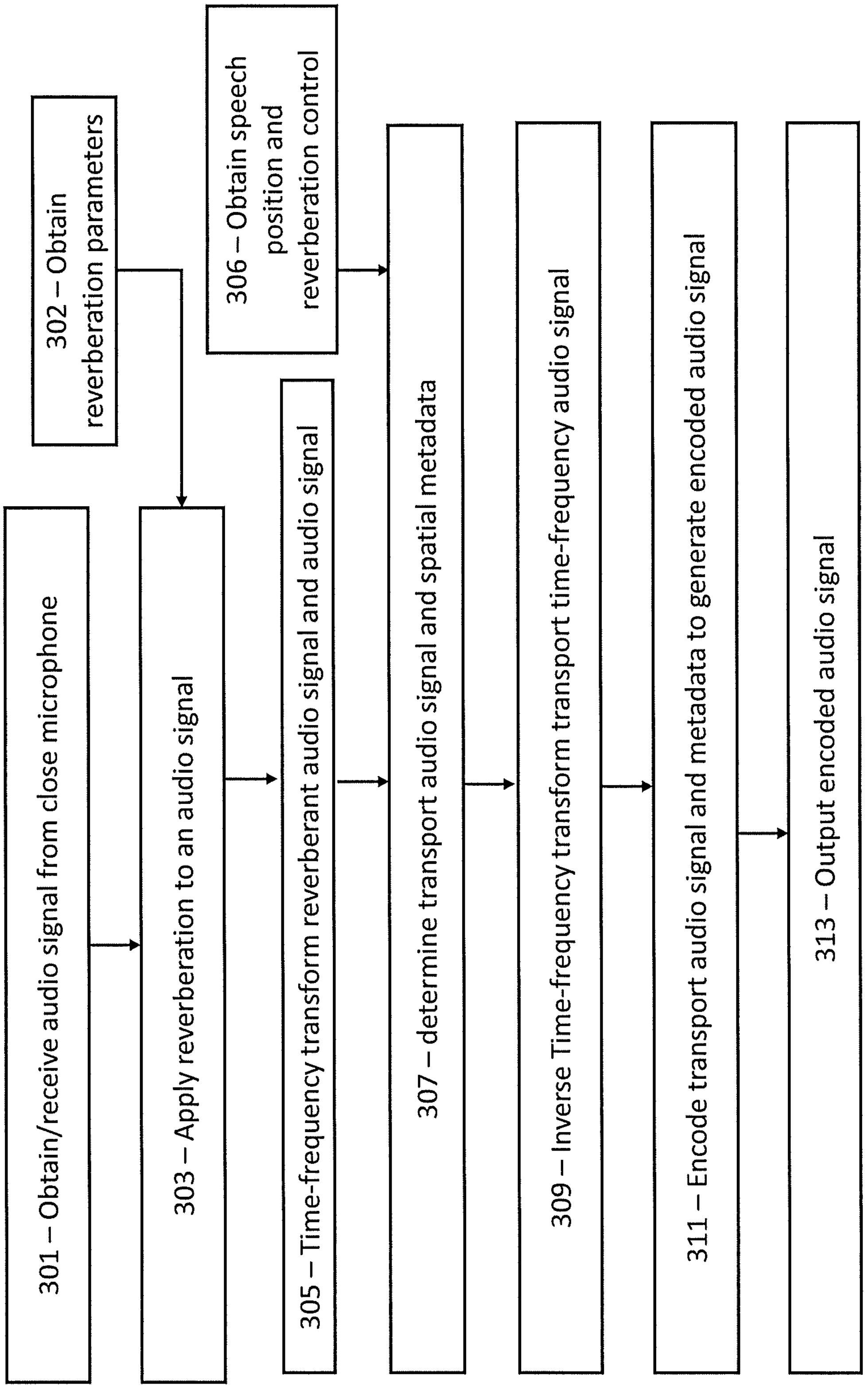
FIG. 3 shows a flow diagram of the operation of the example capture apparatus shown in FIG. 2 according to some embodiments.

With respect to FIG. 3 is shown an example operation of the example apparatus shown in FIG. 2 according to some embodiments.

Thus as shown by 301 the method comprises obtaining/receiving audio signal from close microphone.

Then as shown by 302 is obtaining reverberation parameters (either receiving parameters or obtaining default parameters).

Further is shown by 303 applying reverberation to the audio signal.

Then is shown by 305 time-frequency transforming the audio signals and the reverberated audio signals.

The obtaining of the speech position and reverberation control information is shown by 306.

Then is determined transport audio signal and spatial metadata from the time-frequency audio signals and based on the speech position and the reverberation control as shown by 307.

Then the determined transport audio signal is inverse transformed as shown by 309.

The transport audio signal and the spatial metadata are then encoded to generate an encoded audio signal or audio stream as shown by 311.

The encoded audio signal or audio stream is then output as shown by 313.

As described above, in some embodiments the time domain signals 200 and 204 are forwarded to determiner 207, which then creates the transport audio signal 218 directly in the time domain. In such embodiments the step 309 is not implemented.

With respect to FIG. 4 is shown a schematic view of the processor shown in FIG. 1 operating as a receiver/play-back apparatus or device and configured to receive the encoded signals provided by FIG. 2.

In some embodiments the receiver comprises a decoder 401 configured to receive or obtain the encoded audio signal 400 and is further configured to decode the encoded audio signal 400 (the encoded audio signal is received from an encoder and which also is referred as reference 220 in FIG. 2). The decoder 401 is configured to generate a decoded transport audio signal 402.

Furthermore, the decoder 401 is configured to generate a decoded spatial metadata 490 is decoded having spatial information in frequency bands as a part of the bit stream and provided to the spatial processor 405. E.g., in case a MASA stream was encoded on the capture side using an IVAS encoder, the decoder 401 can be implemented as an IVAS decoder.

The receiver can furthermore in some embodiments comprise a time-frequency transformer 403 which are configured to receive the transport audio signal 402 and generate a time-frequency transport audio signal 404.

Furthermore the receiver can comprise a spatial processor 405. The spatial processor 405 is configured to receive the time-frequency transport audio signal 404 and spatial metadata 490 (and optionally the head orientation data 406). In some embodiments the time-frequency transport audio signal 404 and the spatial metadata 490 are synchronized where the time-frequency transformer 403 produces a delay to the audio path relative to the metadata path. In some embodiments this can be implemented by employing a delay to the spatial metadata with the same delay caused by the time-frequency transformer 403 audio when the time-frequency transport audio signal 404 arrives at the spatial processor 406.

The spatial processor 405 may be implemented based on any suitable manner. The spatial processor 1005 as such can implement the methods detailed in Vilkamo, J., Backstrom, T., & Kuntz, A. (2013). Optimized covariance domain framework for time-frequency processing of spatial audio. Journal of the Audio Engineering Society, 61(6), 403-411, Vilkamo, J., & Pulkki, V. (2013). Minimization of decorrelator artifacts in directional audio coding by covariance domain rendering. Journal of the Audio Engineering Society, 61(9), 637-646, and PCT application WO2019086757A1, where the operation steps are: Determining the input covariance matrix of the time-frequency transport audio signals in frequency bands; Determining the overall energy value in frequency bands which is the trace of the input covariance matrix; Determining a target covariance matrix in frequency bands based on the spatial metadata and the overall energy value; Determining a mixing matrix based on the input and target covariance matrices in frequency bands; Applying the mixing matrix to the time-frequency transport audio signals. The reference NC104083 provided novel spatial audio parameters spread coherence and surround coherence, which could be both assumed zero in these embodiment implementations.

Thus in summary in some embodiments the processor is configured to determine the spatial properties for the output sound in terms of a covariance matrix (e.g., a binaural sound has certain energies, cross correlations, and phase differences in different frequencies), and then determine a least-squares optimized solution to achieve for the sound such properties. If there are too few independent prominent signal components at the transport audio signals, it is an option to mix in decorrelated sound to an appropriate degree with a similar covariance-matrix based mixing operation. In some embodiments the reverberant signals $s_{rev}(b,n)$ are not rendered as separate signals, but the transport audio signals $s_{transport}(b)n)$ are directly rendered without any intermediate signals.

In some embodiments the spatial processor is configured to use the head orientation data to rotate the direction values of the spatial metadata based on the head orientation data. For example, if the spatial metadata indicates a direction at front, but user rotates head by 30 degrees to the right, then the spatial metadata direction would be updated to 30 degrees left. Similarly when the DOA(k,n) points to front (0 degrees), when the user rotates head left by 90 degrees, then DOA(k, n) is changed to −90 degrees. In addition to yaw, the rotation may also include pitch and roll axes, and also movement in a 6DOF sense, for example when the user moves sideways with respect to the computer screen, the direction is then updated accordingly.

Furthermore, in some embodiments the transport audio signals can be processed based on the head orientation data. For example, if the user is facing in a rear direction, the left and right transport audio signals could be processed to mutually replace each other (switched with each other).

The binaural processed time-frequency audio signal 408 can then be provided to an inverse time-frequency transformer 407.

In some embodiments the receiver comprises an inverse time-frequency transformer 407 configured to output the binaural processed signal 410 that is provided to the headphones to be played back to the user.

It should be noted that in some embodiments the decoder comprises all the features described herein. For example the IVAS decoder can decode and render an encoded IVAS stream (which may originate from a MASA stream) to binaural output.

Figure 5:
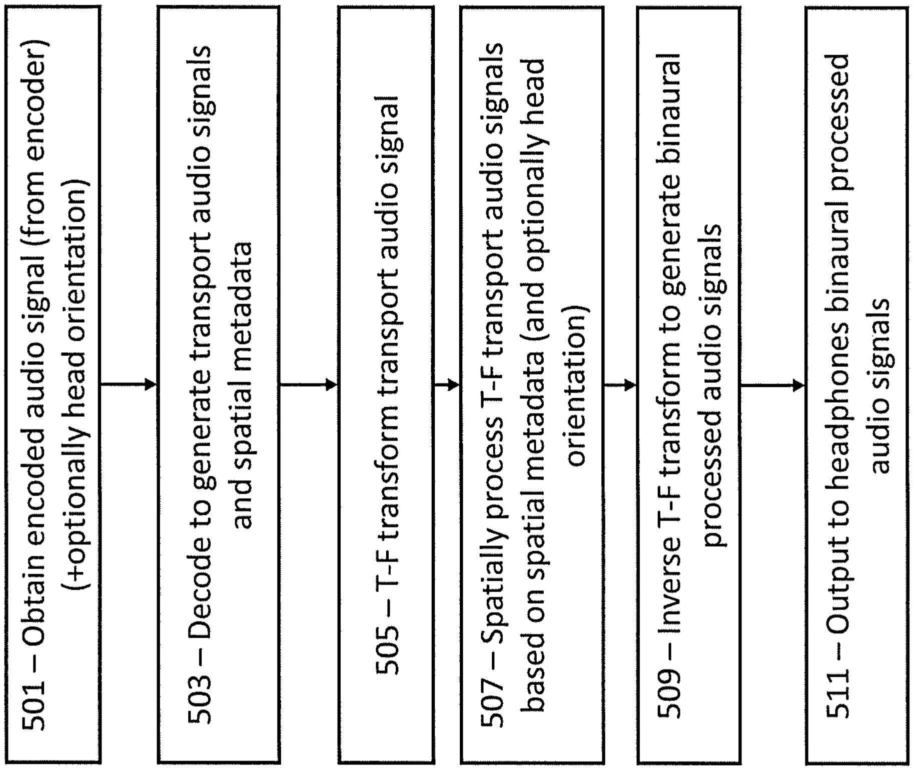
FIG. 5 shows a flow diagram of the operation of the example playback apparatus shown in FIG. 4 according to some embodiments.

Furthermore with respect to FIG. 5 is shown a flow diagram of the operations of the example apparatus shown in FIG. 4 according to some embodiments.

Thus as shown by 501 there is obtaining encoded audio signal (from the encoder) and optionally obtaining head orientation.

Then as shown by 503 there is decoding to generate transport audio signals and spatial metadata.

The transport audio signals are then time-frequency transformed as shown by 505.

As shown by 507 then spatially process time-frequency transport audio signals based on spatial metadata (and optionally head orientation).

Then inverse time-frequency transform the time-frequency binaural processed audio signal to generate binaural processed audio signals as shown by 509.

Then output the binaural processed audio signals to headphones as shown by 511.

Figure 6:
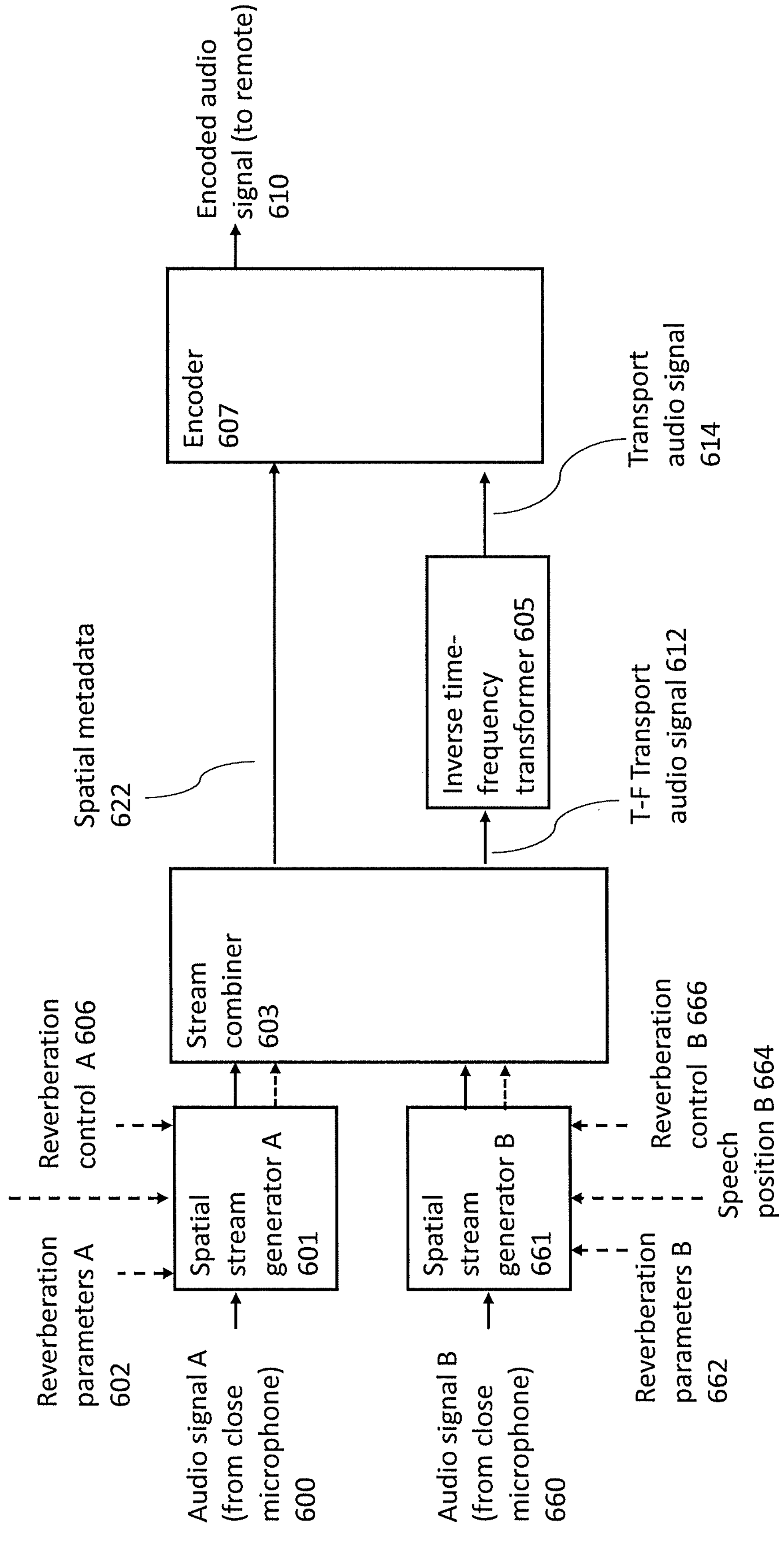
FIG. 6 shows schematically a further example capture apparatus suitable for implementing some embodiments.

With respect to FIG. 6 is shown a processor further encoder/capture device or system that takes audio signals from two different users as an input and generates a single spatial audio stream.

In some embodiments the system comprises a first spatial stream generator A 601 which is configured to obtain a first audio signal, audio signal A (from the first user) 600, and also obtain reverberation parameters A 602, speech position A 604, and reverberation control A 606.

The spatial stream generator A 601 in some embodiments operates in a manner similar to the apparatus shown in FIG. 2 but omitting the inverse time-frequency transformer and encoder. The output of the spatial stream generator 601 is therefore a time-frequency transport audio signal A and spatial metadata A.

In a similar manner the processor can comprise a second spatial stream generator B 661 which is configured to obtain a second audio signal, audio signal B (from the second user) 660, and also obtain reverberation parameters B 662, speech position B 664, and reverberation control B 666.

The spatial stream generator B 661 in some embodiments also is configured to operate in a manner similar to the apparatus shown in FIG. 2 but omitting the inverse time-frequency transformer and encoder. The output of the spatial stream generator 661 is therefore a time-frequency transport audio signal B and spatial metadata B.

In some embodiments the system comprises a stream combiner 603. The stream combiner 603 is configured to obtain the transport time-frequency audio signal A, spatial metadata A, transport time-frequency audio signal B, and spatial metadata B, which combines them to a single stream. In some embodiments the combination is implemented according to the method presented in GB2574238. As simplified, it operates as follows (in one operation mode, see GB2574238 for more operation modes and details).

First, the energy is computed for each stream in frequency bands, e.g., by $$E_A(k,n)=\sum_{b=b_{low}(k)}^{b_{high}(k)} s^H_{transport,A}(b,n)s_{transport,A}(b,n)$$

$$E_B(k,n)=\sum_{b=b_{low}(k)}^{b_{high}(k)} s^H_{transport,B}(b,n)s_{transport,B}(b,n)$$

Then, a weight value is computed for each stream, e.g., by $$w_A(k,n)=E_A(k,n)\text{ratio}_A(k,n)$$

$$w_B(k,n)=E_B(k,n)\text{ratio}_B(k,n)$$

Then, for each time-frequency tile (k,n) it is compared if $w_A$(k,n) or $w_B$(k,n) is larger. Then, the spatial metadata of the stream that has a larger weight w(k, n) is used for that time-frequency tile. E.g., if $w_A$(k,n)>$w_B$(k,n), then DOA(k, n)=$DOA_A$(k,n). This way the spatial metadata for the combined stream is obtained.

In some embodiments the transport audio signals can be combined. For example in some embodiments by summing them $$s_{transport}(b,n)=s_{transport,A}(b,n)+s_{transport,B}(b,n)$$

The resulting transport time-frequency audio signals 612 can be passed to an inverse time-frequency transformer 605 and the spatial metadata 622 can be passed to the encoder 607.

In some embodiments the system can comprise the inverse time-frequency transformer 605 which operates in a manner similar to the inverse time-frequency transformer as shown in FIG. 2 and described above. The transport audio signal 614 can then be passed to the encoder 607.

Furthermore the system can comprise an encoder 607 configured to receive the spatial metadata 622 and transport audio signal 614 and generate an encoded audio signal 610 or audio stream which can be passed to the remote device. The encoder 607 can operate in a manner similar to that described above with respect to the Encoder shown in FIG. 2. As a result, there is only a single encoded audio stream 610 that needs to be transmitted.

Similarly as in context of FIG. 2, in FIG. 6 the transport audio signals 614 can be generated in the time domain based on the audio signals 600 and 660 and the reverberated versions of them, and the spatial stream generators 601 and 661 may provide the transport audio signals as time-domain signals to the stream combiner 603, which combines them in the time domain, for example by $$s_{transport}(t,i)=s_{transport,A}(t,i)+s_{transport,B}(t,1)$$

where $s_{transport}$(t,i) is the transport audio signal 614 provided to the encoder 607, and then the inverse time-frequency transform 605 is not needed.

It should be noted that different spatial audio streams can originate from anywhere, not just from the close-microphone captures. E.g., some of them may have been generated from a mobile device microphone-array capture as described above.

Moreover, in some embodiments there may be more inputs than two. In that case, the stream combiner can be implemented similarly, but instead of comparing two weight values, it determines the largest of all weight values, and the spatial metadata of that stream is used from that time-frequency tile.

Figure 7:
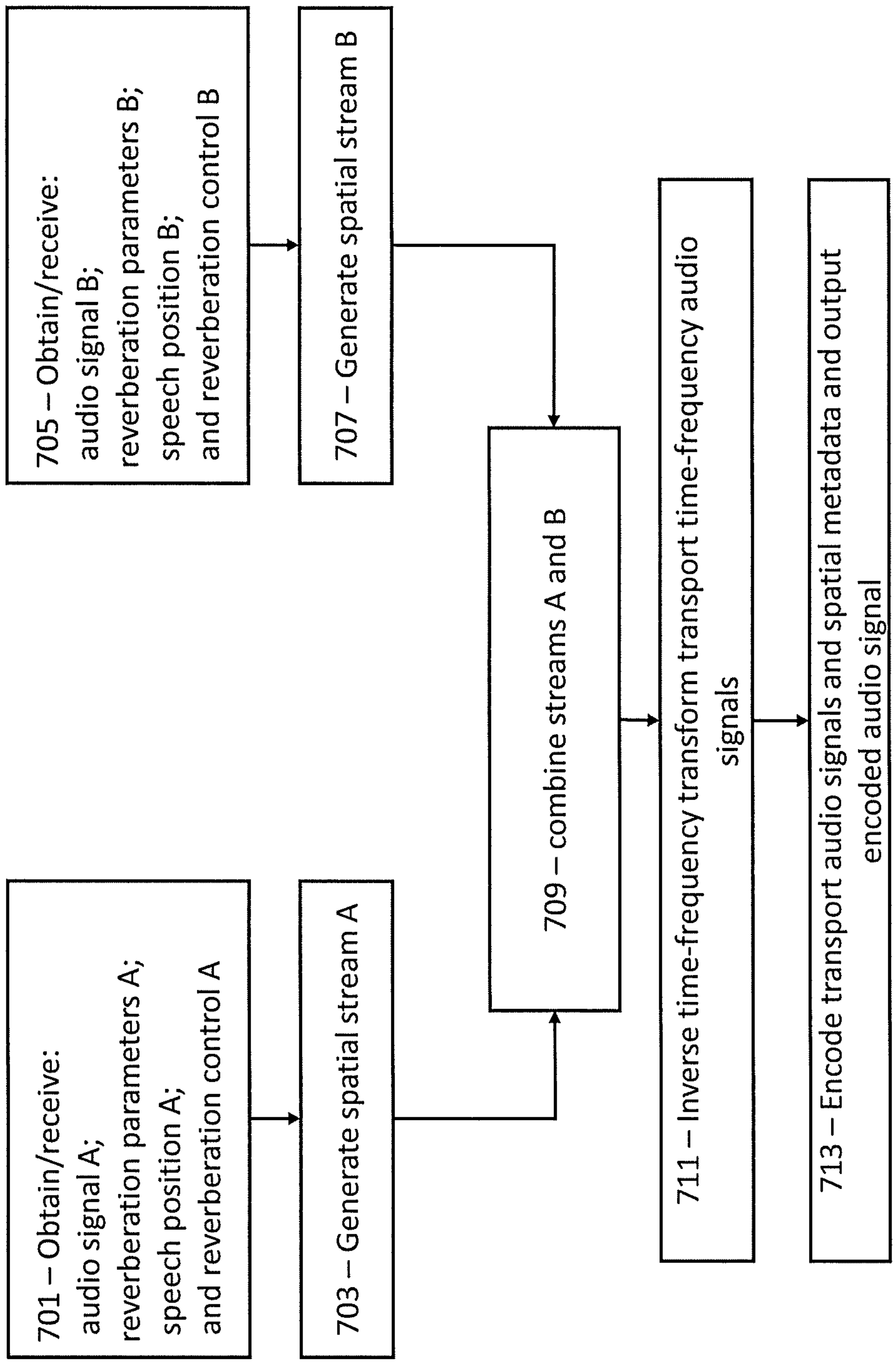
FIG. 7 shows a flow diagram of the operation of the further example capture apparatus shown in FIG. 6 according to some embodiments.

A flow diagram of the example operations of the combiner system as shown in FIG. 6 is shown in FIG. 7.

Thus as shown in 701 there is the operation of obtaining/receiving: audio signal A; reverberation parameters A; speech position A; and reverberation control A.

Then a spatial stream A is generated from the audio signal A based on the reverberation parameters A, speech position A and reverberation control A as shown in 703.

Furthermore as shown in 705 there is the operation of obtaining/receiving: audio signal B; reverberation parameters B; speech position B; and reverberation control B.

Then a spatial stream B is generated from the audio signal B based on the reverberation parameters B, speech position B and reverberation control B as shown in 707.

The spatial streams A and B are then combined as shown by 709.

The transport time-frequency audio signals are inverse time-frequency transformed as shown by 711.

Furthermore the transport audio signals and spatial metadata are encoded and output as shown by 713.

As described above in some embodiments the transport time-frequency audio signals are generated in the time domain and thus there is no inverse time-frequency transformation step 711.

Figure 8:
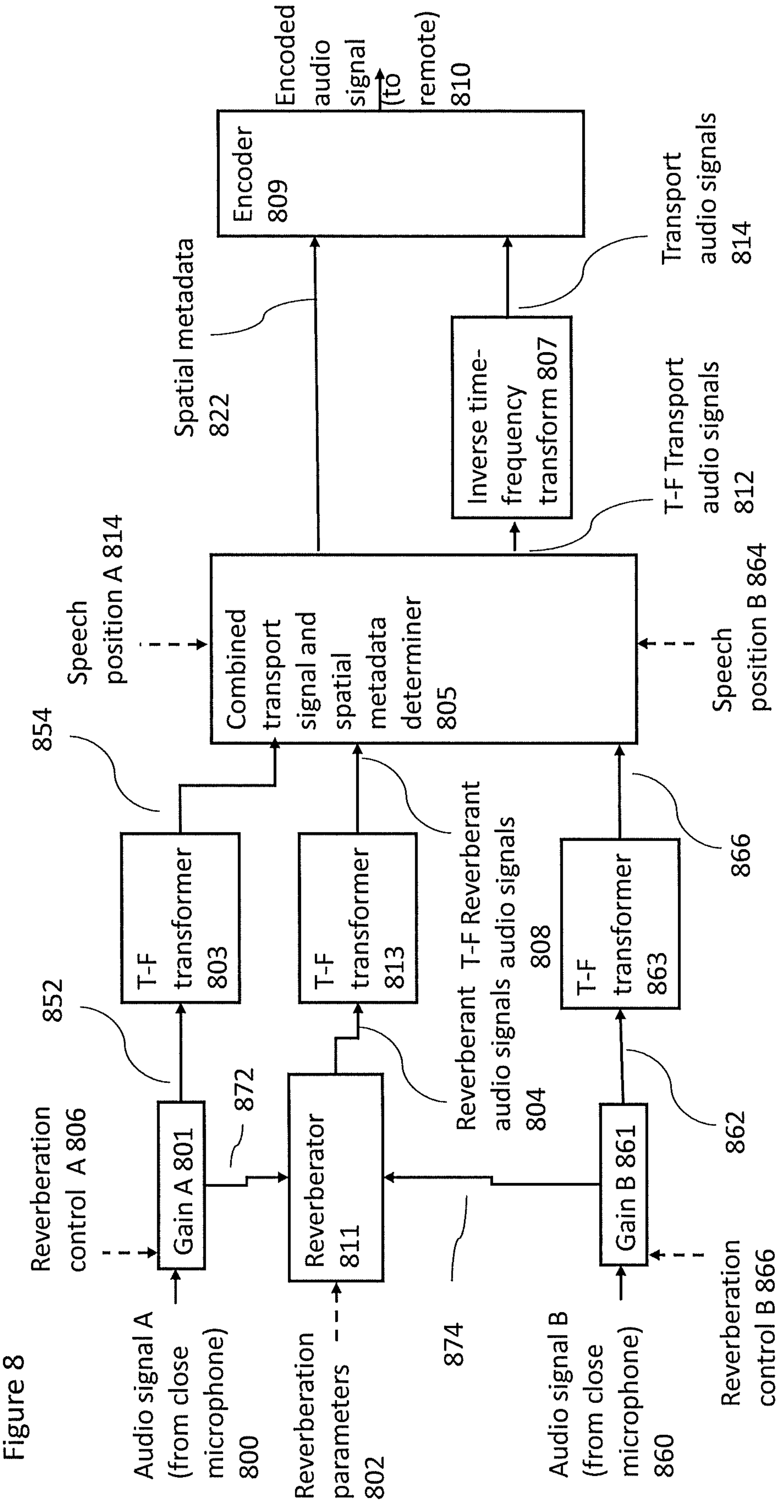
FIG. 8 shows schematically a further example capture apparatus suitable for implementing some embodiments.

With respect to FIG. 8 is shown a further system for combining streams for multiple inputs.

In some embodiments the system comprises a gain A 801 configured to receive or obtain the audio signal A 800, denoted $s_A(t)$, and the reverberation control A 806. The gain A 801 is configured to apply the reverberation control A 806 gains $g_{s,A}$ and $g_{r,A}$ that were applied in the transport signals and spatial metadata determiner shown above. The gains are applied here as the signals are mixed before being reverberated. In other words, signals $g_{s,A}s_A(t)$ 852 and $g_{r,A}s_A(t)$ 872 are generated.

The system further comprises a further gain B 861 configured to receive or obtain the audio signal B 860, denoted $s_B(t)$, and the reverberation control B 866. The gain B 861 is configured to apply the reverberation control B 866 gains $g_{s,B}$ and $g_{r,B}$ that were applied in the transport signals and spatial metadata determiner shown above. In other words, signals $g_{s,b}s_B(t)$ 862 and $g_{r,B}s_B(t)$ 874 are generated.

The signals 872 and 874 can then be passed to a reverberator 811 and the signals 852 and 862 can be passed to time-frequency transformers 803 (for signal 852) and 863 (for signal 862).

The system further comprises a reverberator 811. The reverberator 811 is configured to receive the reverberation parameters 802 and the signals $g_{r,A}s_A(t)$ 872 and $g_{r,B}s_B(t)$ 874, and sums them, and reverberates the summed signal, according to the reverberation parameters 802 and as was discussed above. The reverberant audio signals 804 can then be passed to a time-frequency transformer 813.

The reverberant audio signals 804 and the gained audio signals 852, 862 (with gains $g_{s,A}$ and $g_{s,B}$) are forwarded to (respective) time-frequency transformers 803, 813, 863 which operate as described above. The resulting time-frequency signals 808, 854, 866 are forwarded to the combined transport signal and spatial metadata determiner 805.

The system comprises a combined transport signal and spatial metadata determiner 805 which is configured to receive the time-frequency audio signal A $$S'_A(b, n)$$

854, time-frequency audio signal B $S_B'(b,n)$ 866, and the reverberant time-frequency audio signals $$s'_{rev}(b, n)$$

808. As mentioned above, the gains $g_{s,A}$, $g_{r,A}$, $g_{s,B}$, and $g_{r,B}$ have already been applied. Additionally is received the speech positions A $DOA_A(n)$814 and speech position B $DOA_B(n)$ 864. The transport time-frequency audio signals 812 can thus be generated using $$s_{transport}(b,n)=p(DOA_A(n))S'_A(b,n)+p(DOA_B(n))S'_B(b,n)+s'_{rev}(b,n)$$

The metadata can, for example, be generated by first generating weights for each input using the gained input signals, by $$w_A(k, n) = \sum_{b=b_{low}(k)}^{b_{high}(k)} |S'_A(b, n)|^2$$

$$w_B(k, n) = \sum_{b=b_{low}(k)}^{b_{high}(k)} |S'_B(b, n)|^2$$

Then, based on the weights, the metadata can be formed.

E.g., if $w_A(k, n) > w_B(k, n)$, then $$DOA(k, n) = DOA_A(k, n)$$

$$\text{ratio}(k, n) = \frac{\sum_{b=b_{low}(k)}^{b_{high}(k)} |S'_A(b, n)|^2}{\sum_{b=b_{low}(k)}^{b_{high}(k)} |S'_A(b, n)|^2 + \sum_{b=b_{low}(k)}^{b_{high}(k)} s^H_{rev}(b, n)s_{rev}(b, n)}$$

and if $w_A(k, n) \le w_B(k, n)$, then $$DOA(k, n) = DOA_B(k, n)$$

$$\text{ratio}(k, n) = \frac{\sum_{b=b_{low}(k)}^{b_{high}(k)} |S'_B(b, n)|^2}{\sum_{b=b_{low}(k)}^{b_{high}(k)} |S'_B(b, n)|^2 + \sum_{b=b_{low}(k)}^{b_{high}(k)} s^H_{rev}(b, n)s_{rev}(b, n)}$$

The resulting time-frequency transport audio signals 812 and spatial metadata 822 can be processed as presented in FIG. 2 using the inverse time-frequency transformer 807 and encoder 809 blocks. As a result, there is only a single encoded audio signal or audio stream 810 that needs to be transmitted.

In some embodiments these signals can be combined with MASA signals from some other source, and the streams combiner can be applied before the inverse time-frequency transformer 807 and the encoder 809.

Similarly as in context of FIGS. 2 and 6, the transport audio signals 814 may also here be alternatively generated in the time domain. This means that the combined transport signal and spatial metadata determiner 805 receives also the signals prior to the time-frequency transformers 803, 813 and 863, and performs the combining based these time domain signals. Then the resulting time-domain processed transport audio signals 814 are provided from the combined transport signal and spatial metadata determiner 805 directly to the encoder 809 without the need of the inverse time-frequency transform 807.

Figure 9:
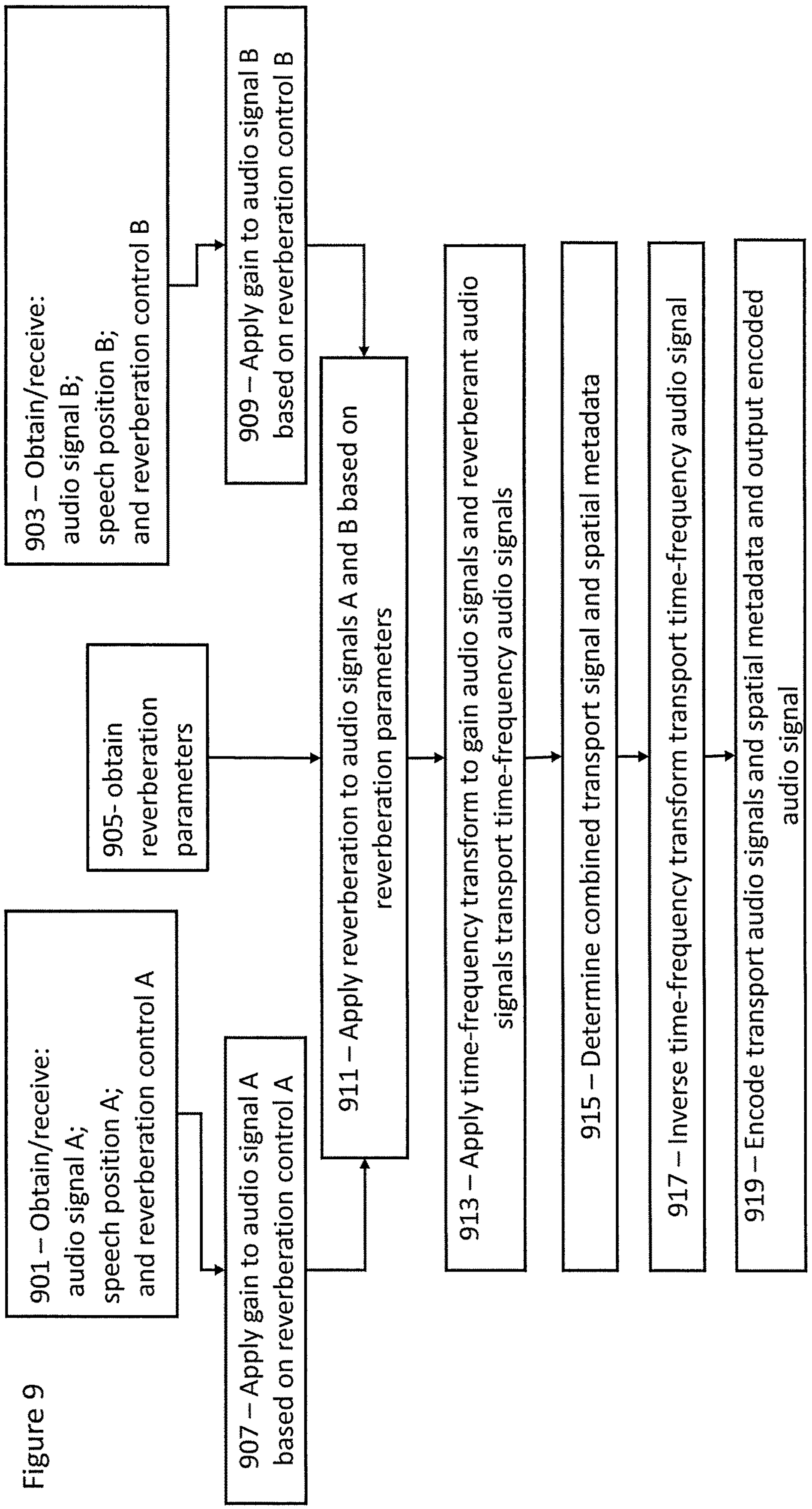
FIG. 9 shows a flow diagram of the operation of the further example capture apparatus shown in FIG. 8 according to some embodiments.

A flow diagram of the example operations of the combiner system as shown in FIG. 8 is shown in FIG. 9.

Thus as shown in 901 there is the operation of obtaining/receiving: audio signal A; speech position A; and reverberation control A.

Then gains are applied to audio signal A based on the reverberation control A as shown in 907.

Further as shown in 903 there is the operation of obtaining/receiving: audio signal B; speech position B; and reverberation control B.

Then gains are applied to audio signal B based on reverberation control B as shown in 909.

The reverberation parameters are then obtained as shown by 905.

Reverberation, based on the reverberation parameters, is applied to a combined form of audio signals A and B as shown by 911.

The time-frequency transforms are applied to the gain audio signals A and B and the reverberant audio signals as shown by 913.

Then a combined transport audio signal and spatial metadata are determined as shown by 915.

The transport time-frequency audio signal is inverse time-frequency transformed as shown by 917.

Furthermore the transport audio signal and spatial metadata are encoded and output as shown by 919.

As described above in some embodiments the inverse time-frequency transform step 917 is not implemented where the combined transport audio signal is in the time domain.

Figure 10:
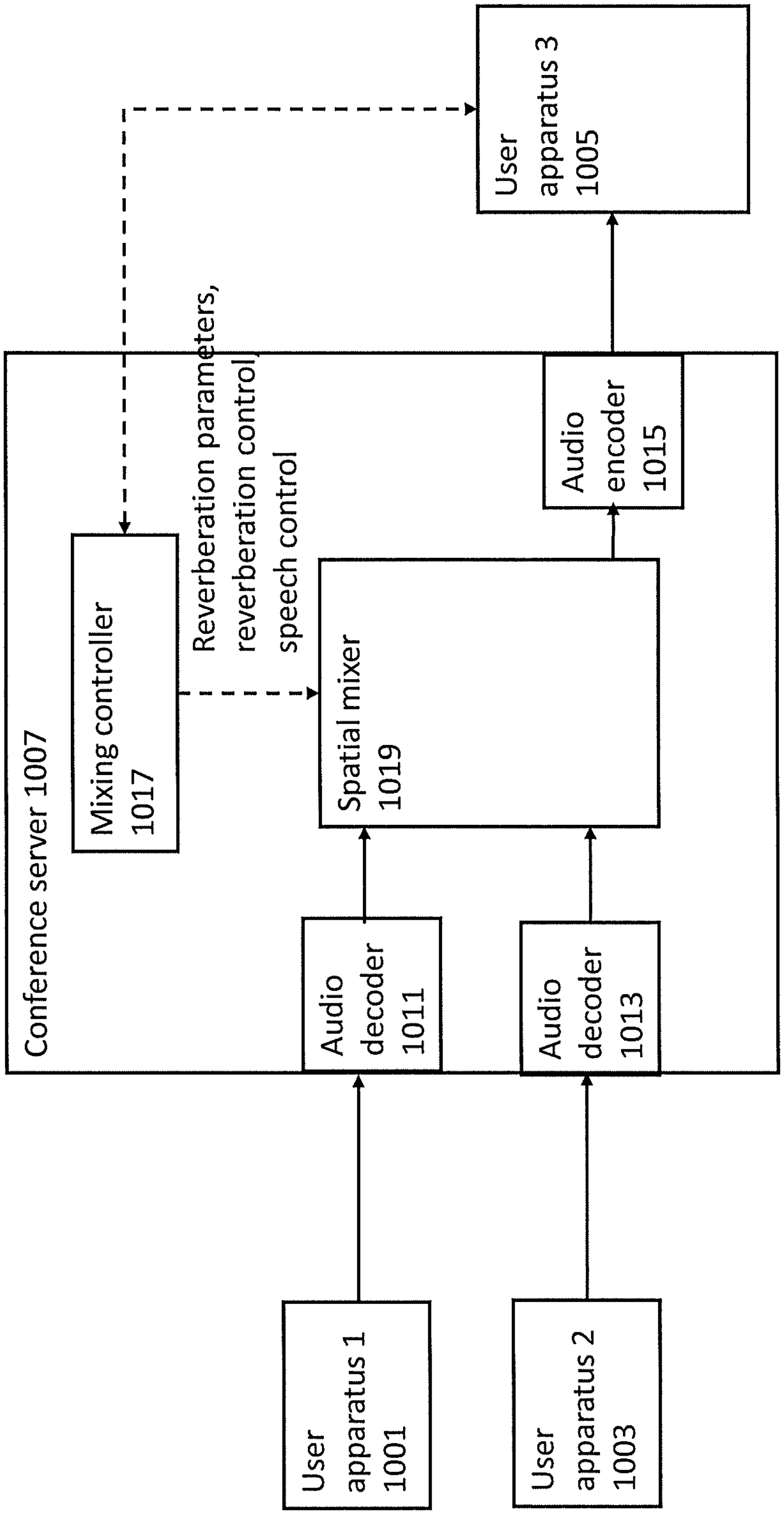
FIG. 10 shows schematically an example system of apparatus suitable for implementing some embodiments.

FIG. 10 presents a system configured to perform processing (on a voice conferencing server) according to some embodiments, where three user apparatuses 1001, 1003, 1005 (clients) are connected to a conference session operating on a conference server 1007.

For simplicity, only the processing of audio signals from user apparatus 1 1001 and user apparatus 2 1003 for the user apparatus 3 1005 has been presented (jitter buffering, gain controls etc. have been omitted from this figure).

In practice, there would be similar processing for each user apparatus (i.e., also for user apparatus 1 and 2).

Apparatus 1 1001 and apparatus 2 1003 are configured to send encoded (monophonic) audio signals (from close microphones) to the conference server 1007. The conference server 1007 comprises audio decoders 1011 and 1013 configured to decode these signals and feed the output signals to a spatial mixer 1019. Additionally a mixing controller 1017 is configured to control the spatial mixer 1019 and defines necessary controls for the mixing including the reverberation parameters, reverberation control, and speech position for each input audio signal.

In some embodiments these controls may be determined automatically in the mixing controller 1017 and may be based on the number of audio signals to be mixed (predefined spatial positions based on the number of audio sources) and using some default preset for reverberation. Alternatively, the participant him/herself (for example user apparatus 3 1005) may be configured to interactively define spatial positions for each audio source and define also the reverberation preset (e.g., small room) via control channel between user apparatus 3 1005 and the mixing controller 1017 on the conference server. The participant using the user apparatus 3 1005 may have a graphical user interface that presents avatars of other conference participants. The avatar position on the UI may determine spatial position for the corresponding sound source. For example, when user moves avatar representing participant of user apparatus 1 1001 from front to the left side, the speech source moves from front to the left side.

In some embodiments the common spatial audio stream (e.g., a MASA stream) from the different inputs may, e.g., be generated using the methods presented herein. The spatial audio stream output from the "Spatial mixer" is encoded with an appropriate audio encoder (e.g., an IVAS encoder) and transmitted to the user apparatus 3 1005 via the audio encoder 1015. The user apparatus 1005 may be configured with head-tracked headphones in use, since the received spatial audio stream allows head-tracked listening experience.

In some embodiments the conference server 1007 may receive also other kind of inputs. For example the conference server 1007 can be configured to receive audio from some user as monophonic audio signals (as presented above), and it may also receive audio from some users as MASA streams. In these embodiments the conference server 1007 may be configured to combine them using the stream combiner as described above.

In some embodiments where an artificial room effect is processed for a sound source, the gains for the direct sound and the reverberated sound may be derived from sound propagation models for acoustic spaces. Typically, the level of the direct sound decreases 6 dB when a distance is doubled, and respectively, the level of the reverberated sound will decrease slightly less than that which depends on the properties of the virtual room. By this way, when sound source moves farther from the listener it starts to sound more reverberated and when it moves closer him it sounds less reverberated. Direct-to-reverberant ratio can be employed as a distance cue for the listener in some embodiments.

In some embodiments optional audio effects may be processed in the processor. For example real-time audio effects may be processed for the input audio signals, including source directivity, doppler effect, and depending on the virtual environment, e.g., obstruction and occlusion effects. These effects can be included in the processing chains presented in the above embodiments even not shown directly in the above examples.

Figure 11:
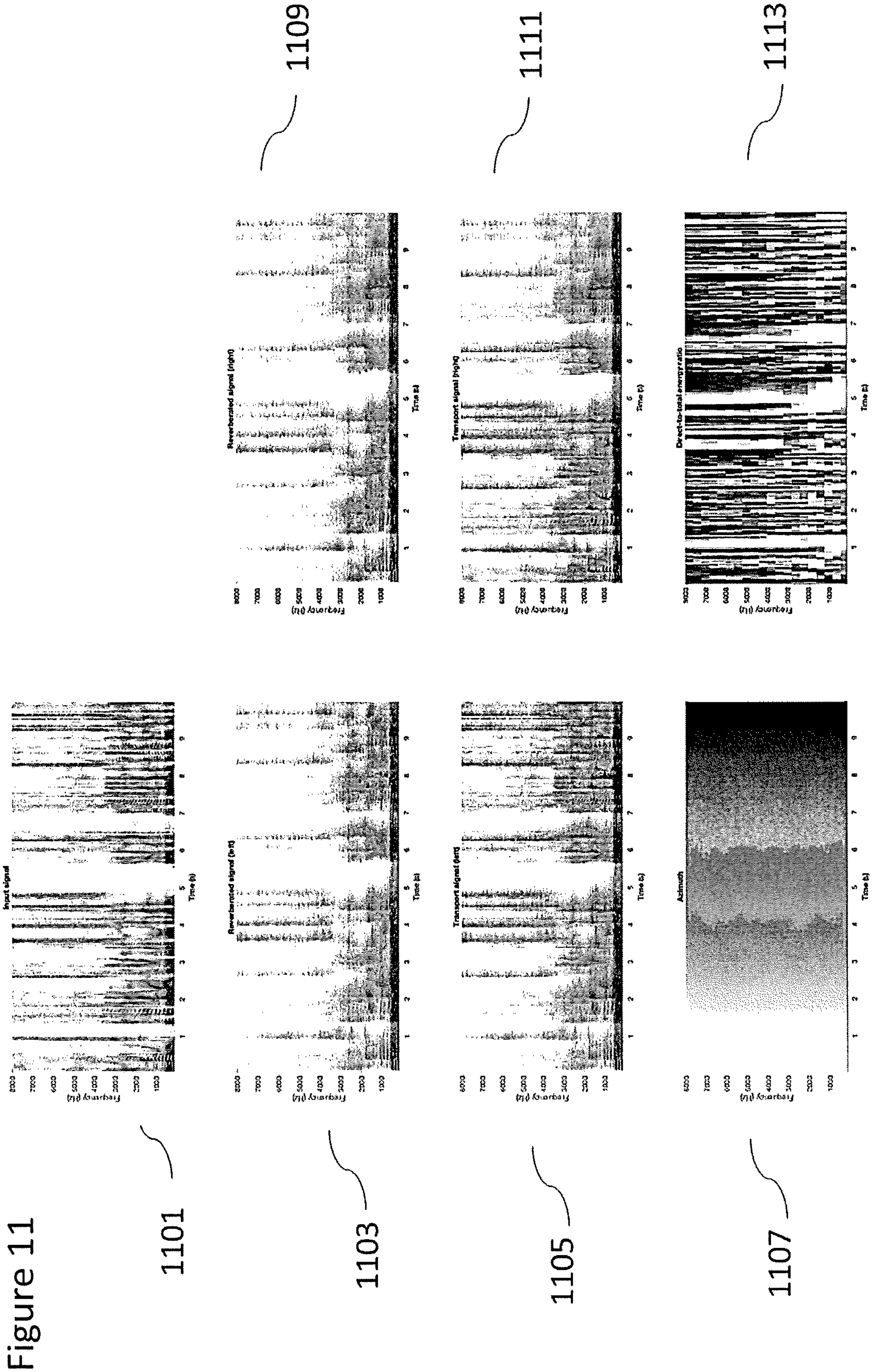
FIG. 11 shows example processing outputs.

In some embodiments FIG. 11 shows graphs of example outputs implementing embodiments such as described above. In the example, the speech of a user is captured with a close microphone and is positioned first to the right (−90 degrees), and then slowly moved towards left and reaching left (90 degrees) at the end of the sample. Reverberation is added with a moderate level.

In the first row 1101 the input to the system is presented, which is the close microphone captured (monaural) speech.

The second row 1103 and 1109 shows the reverberated left and right signals that have been produced using the reverberator.

The third row 1105 and 1111 shows the generated transport audio signals. It can be seen in the figure that at the beginning of the sample the input speech is more prominent in the right channel, as the speaker is positioned to −90 degrees, and that in the end it is more prominent in the left channel, as the speaker is positioned to 90 degrees. In addition, it can be seen in the figure that the reverberated speech is equally prominent in both channel throughout the sample.

The fourth row 1107 and 1113 shows the generated spatial metadata, or to be precise, the direction 1107 (left column) and the direct-to-total energy ratio 1113 (right column) parameters. The direction is presented in the form of an azimuth angle. It first has the value of −90 degrees, and it slowly changes to 90 degrees. The values are the same at all frequencies. On the contrary, the values of the direct-to-total energy ratio are different at different frequencies, depending on the instant ratio of the energy of the input speech and the total energy in a certain time-frequency tile.

In some embodiments generating, based on the at least one reverberation parameter, at least one reverberant audio signal from a respective at least one mono-channel audio signal is where the reverberation parameter configures the reverberator to be able to generate an audio signal with no direct audio signal component.

The transport audio signals and the spatial metadata can be used to produce a MASA stream, which can, e.g., be encoded using an IVAS encoder. Moreover, the MASA stream can be combined with other MASA streams (from any input). The encoded MASA stream can then be transmitted to a certain user, where it can be used to, e.g., render head-tracked binaural audio.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method for generating a parametric spatial audio stream, the method comprising:

obtaining at least one mono-channel audio signal from at least one close microphone;

obtaining at least one reverberation parameter;

obtaining at least one control parameter configured to control spatial features of the parametric spatial audio stream;

generating, based on the at least one reverberation parameter, at least one reverberated audio signal from a respective at least one mono-channel audio signal of the at least one mono-channel audio signal;

generating at least one spatial metadata parameter based on at least: the at least one mono-channel audio signal, the at least one reverberated audio signal, and the at least one control parameter; and encoding the at least one reverberated audio signal and the at least one spatial metadata parameter to generate the parametric spatial audio stream.

2. The method as claimed in claim 1, wherein generating the at least one reverberated audio signal from the respective at least one mono-channel audio signal comprises:

generating, based on the at least one reverberation parameter, at least one reverberant audio signal from the respective at least one mono-channel audio signal; and combining, based on the at least one control parameter, the at least one mono-channel audio signal and a respective at least one reverberant audio signal of the at least one reverberant audio signal to generate the at least one reverberated audio signal.

3. The method as claimed in claim 2, wherein combining the at least one mono-channel audio signal and the respective at least one reverberant audio signal to generate the at least one reverberated audio signal comprises:

obtaining at least one further control parameter configured to define a contribution of the at least one mono-channel audio signal and the respective at least one reverberant audio signal in the at least one reverberated audio signal; and generating the at least one reverberated audio signal based on the contribution of the at least one mono-channel audio signal and the respective at least one reverberant audio signal defined with the at least one further control parameter.

4. The method as claimed in claim 3, wherein combining the at least one mono-channel audio signal and the respective at least one reverberant audio signal to generate the at least one reverberated audio signal comprises:

obtaining at least one of at least one direction or position parameter defining at least one of at least one direction or position of the at least one mono-channel audio signal within an audio scene;

generating panning gains based on the at least one of the at least one direction or position parameter; and applying the panning gains to the at least one mono-channel audio signal.

5. The method as claimed in claim 1, wherein the at least one reverberated audio signal comprises a combination of:

a reverberant audio signal part from the at least one mono-channel audio signal; and a direct audio signal part based on the respective at least one mono-channel audio signal.

6. The method as claimed in claim 1, wherein obtaining the at least one mono-channel audio signal from the at least one close microphone comprises at least one of:

obtaining the at least one mono-channel audio signal; or beamforming at least two audio signals to generate the at least one mono-channel audio signal.

7. The method as claimed in claim 1, wherein the at least one reverberation parameter comprises at least one of:

at least one impulse response;

a preprocessed version of the at least one impulse response;

at least one parameter based on the at least one impulse response;

at least one desired reverberation time;

at least one reverberant-to-direct ratio;

at least one room dimension;

at least one room material acoustic parameter;

at least one decay time;

at least one early reflections level;

at least one diffusion parameter;

at least one predelay parameter;

at least one damping parameter; or at least one acoustics space descriptor.

8. The method as claimed in claim 1, wherein obtaining the at least one mono-channel audio signal from the at least one close microphone comprises:

obtaining a first mono-channel audio signal and a second mono-channel audio signal.

9. The method as claimed in claim 8, wherein the first mono-channel audio signal is obtained from a first close microphone and the second mono-channel audio signal is obtained from a second close microphone.

10. The method as claimed in claim 9, wherein the first close microphone is a microphone located on or near a first user and the second close microphone is a microphone located on or near a second user.

11. The method as claimed in claim 8, wherein generating the at least one reverberated audio signal from the respective at least one mono-channel audio signal comprises:

generating a first reverberant audio signal from the first mono-channel audio signal; and generating a second reverberant audio signal from the second mono-channel audio signal.

12. The method as claimed in claim 11, further comprising:

generating a first audio signal based on a combination of the first mono-channel audio signal and a respective first reverberant audio signal;

generating a second audio signal based on a combination of the second mono-channel audio signal and a respective second reverberant audio signal; and combining the first audio signal and the second audio signal to generate the at least one reverberated audio signal.

13. The method as claimed in claim 8, wherein generating the at least one spatial metadata parameter comprises:

generating a first at least one spatial metadata parameter associated with the first mono-channel audio signal;

generating a second at least one spatial metadata parameter associated with the second mono-channel audio signal;

determining which of the first mono-channel audio signal or the second mono-channel audio signal is more predominant; and selecting one or other of the first at least one spatial metadata parameter or the second at least one spatial metadata parameter based on the determining which of the first mono-channel audio signal or the second mono-channel audio signal is more predominant.

14. The method as claimed in claim 8, wherein generating at least one reverberated audio signal from the respective at least one mono-channel audio signal comprises:

generating a first gained audio signal from the first mono-channel audio signal, the first gained audio signal based on a first gain applied to the first mono-channel audio signal;

generating a second gained audio signal from the second mono-channel audio signal, the second gained audio signal based on a second gain applied to the second mono-channel audio signal;

applying a reverberation to a combined first gained audio signal and second gained audio signal to generate at least one reverberant audio signal;

generating a further first gained audio signal from the first mono-channel audio signal, the further first gained audio signal based on a further first gain applied to the first mono-channel audio signal;

generating a further second gained audio signal from the second mono-channel audio signal, the further second gained audio signal based on a further second gain applied to the second mono-channel audio signal; and combining the at least one reverberant audio signal, the further first gained audio signal, and the further second gained audio signal to generate the at least one reverberated audio signal.

15. The method as claimed in claim 8, wherein generating the at least one spatial metadata parameter comprises:

generating a first at least one spatial metadata parameter associated with the first mono-channel audio signal;

generating a second at least one spatial metadata parameter associated with the second mono-channel audio signal;

determining which of the first mono-channel audio signal or the second mono-channel audio signal is more predominant; and determining the at least one spatial metadata from one or other of the first at least one spatial metadata parameter or the second at least one spatial metadata parameter based on the determining which of the first mono-channel audio signal or the second mono-channel audio signal is more predominant.

16. The method as claimed in claim 1, wherein the at least one reverberated audio signal is a reverberated mono-channel audio signal.

17. A non-transitory computer-readable medium comprising instructions stored thereon for performing at least the following:

obtaining at least one mono-channel audio signal from at least one close microphone;

obtaining at least one reverberation parameter;

obtaining at least one control parameter configured to control spatial features of a parametric spatial audio stream;

generating, based on the at least one reverberation parameter, at least one reverberated audio signal from a respective at least one mono-channel audio signal of the at least one mono-channel audio signal;

generating at least one spatial metadata parameter based on at least: the at least one mono-channel audio signal, the at least one reverberated audio signal, and the at least one control parameter; and encoding the at least one reverberated audio signal and the at least one spatial metadata parameter to generate the parametric spatial audio stream.

18. An apparatus comprising:

at least one processor; and at least one memory storing instructions that, when executed with the at least one processor, cause the apparatus at least to:

obtain at least one mono-channel audio signal from at least one close microphone;

obtain at least one reverberation parameter;

obtain at least one control parameter configured to control spatial features of a parametric spatial audio stream;

generate, based on the at least one reverberation parameter, at least one reverberated audio signal from a respective at least one mono-channel audio signal of the at least one mono-channel audio signal;

generate at least one spatial metadata parameter based on at least: the at least one mono-channel audio signal, the at least one reverberated audio signal, and the at least one control parameter; and encode the at least one reverberated audio signal and the at least one spatial metadata parameter to generate the parametric spatial audio stream.

19. The apparatus as claimed in claim 18, wherein generating the at least one reverberated audio signal from the respective at least one mono-channel audio signal comprises the instructions, when executed with the at least one processor, cause the apparatus to:

generate, based on the at least one reverberation parameter, at least one reverberant audio signal from the respective at least one mono-channel audio signal; and combine, based on the at least one control parameter, the at least one mono-channel audio signal and a respective at least one reverberant audio signal of the at least one reverberant audio signal to generate the at least one reverberated audio signal.

20. The apparatus as claimed in claim 18, wherein obtaining the at least one mono-channel audio signal from the at least one close microphone comprises the instructions, when executed with the at least one processor, cause the apparatus to:

obtain a first mono-channel audio signal and a second mono-channel audio signal.

* * * * *